United States Patent
Li et al.

(10) Patent No.: US 12,528,901 B2
(45) Date of Patent: Jan. 20, 2026

(54) MODIFIED POLYMER, COMPOSITION, COATING FILM AND MULTILAYER BODY

(71) Applicants: DAIKIN FLUOROCHEMICALS (CHINA) CO., LTD., Jiangsu (CN); DAIKIN INDUSTRIES, LTD., Osaka (JP)

(72) Inventors: Wenbin Li, Jiangsu (CN); Xin Zeng, Jiangsu (CN); Hideto Nakagawa, Jiangsu (CN)

(73) Assignees: DAIKIN FLUOROCHEMICALS (CHINA) CO., LTD., Jiangsu (CN); DAIKIN INDUSTRIES, LTD., Osaka (JP)

( * ) Notice: Subject to any disclaimer, the term of this patent is extended or adjusted under 35 U.S.C. 154(b) by 707 days.

(21) Appl. No.: 17/696,350

(22) Filed: Mar. 16, 2022

(65) Prior Publication Data

US 2022/0275132 A1  Sep. 1, 2022

Related U.S. Application Data

(63) Continuation of application No. PCT/JP2020/032400, filed on Aug. 27, 2020.

(30) Foreign Application Priority Data

Sep. 17, 2019 (CN) .......................... 201910874511.9

(51) Int. Cl.
*C08F 259/08* (2006.01)
*C09D 151/00* (2006.01)

(52) U.S. Cl.
CPC ........ *C08F 259/08* (2013.01); *C09D 151/003* (2013.01)

(58) Field of Classification Search
CPC ...... C08F 259/08; C08F 2810/20; C08F 8/00; C08F 214/267; C09D 5/1668
See application file for complete search history.

(56) References Cited

U.S. PATENT DOCUMENTS

| | | | |
|---|---|---|---|
| 5,283,304 | A | 2/1994 | Nakabayashi et al. |
| 2006/0054053 | A1 | 3/2006 | Masutani et al. |
| 2010/0113662 | A1 | 5/2010 | Masutani et al. |

FOREIGN PATENT DOCUMENTS

| | | | | |
|---|---|---|---|---|
| CN | 107043582 | A | | 8/2017 |
| CN | 107099237 | A | | 8/2017 |
| CN | 108091930 | A | | 5/2018 |
| CN | 109280205 | A | | 1/2019 |
| CN | 110152508 | A | | 8/2019 |
| JP | 5-43831 | A | | 2/1993 |
| JP | 07-286283 | A | | 10/1995 |
| JP | 11-060646 | A | | 3/1999 |
| JP | 2001163927 | A | * | 6/2001 |
| KR | 10-1992429 | B1 | | 6/2019 |
| WO | 2004/067658 | A1 | | 8/2004 |
| WO | 2015/152310 | A1 | | 10/2015 |
| WO | WO-2018173508 | A1 | * | 9/2018 ............... B05D 5/00 |

OTHER PUBLICATIONS

International Search Report for PCT/JP2020/032400 dated, Nov. 10, 2020 (PCT/ISA/210).
International Preliminary Report on Patentability issued Mar. 15, 2022 in International Application No. PCT/JP2020/032400.
Extended European Search Report issued Sep. 18, 2023 in European Application No. 20865085.3.

\* cited by examiner

*Primary Examiner* — Katarzyna I Kolb
(74) *Attorney, Agent, or Firm* — Sughrue Mion, PLLC

(57) ABSTRACT

A modified polymer including (a) a main chain containing a fluorine-containing polymer and (b) a side chain represented by the following formula (b1') and/or a side chain represented by the following formula (b2'). The formula (b1') is $-CH_2-CR^{b1}(-X)-C(=O)-Y-Z-Rf$, wherein X is a hydrogen atom, a methyl group, or a halogen atom; Y is $-O-$ or $-NH-$; Z is a direct bond or a divalent organic group; Rf is a C1-C20 fluoroalkyl group; and $R^{b1}$ is a hydrogen atom or a monovalent organic group. The formula (b2') is $-CH_2-CR^{b2}(-R^1)-C(=O)-O-Si(-CH_3)_2-[O-Si(-CH_3)_2]_n-O-Si(-CH_3)_2-R^2$, wherein $R^1$ is a hydrogen atom or a methyl group; $R^2$ is a hydrogen atom or a methyl group; $R^{b2}$ is a hydrogen atom or a monovalent organic group; and n is 3 to 200.

15 Claims, No Drawings

MODIFIED POLYMER, COMPOSITION, COATING FILM AND MULTILAYER BODY

CROSS-REFERENCE TO RELATED APPLICATIONS

This application is a Rule 53(b) Continuation of International Application No. PCT/JP2020/032400 filed Aug. 27, 2020, which claims priority based on Chinese Patent Application No. 201910874511.9 filed Sep. 17, 2019, the respective disclosures of which are incorporated herein by reference in their entireties.

TECHNICAL FIELD

The present invention relates to modified polymers, compositions, coating films, and laminates.

BACKGROUND ART

Fluorine-containing polymers have high bond energy and low polarizability of C—F bonds in the molecule and are therefore excellent in properties such as weather resistance. In use for building materials, for example, fluorine-containing polymers need to have excellent antifouling properties in addition to the weather resistance. For this reason, various studies have been performed.

For example, Patent Literature 1 discloses a coating composition containing (A) a synthetic resin having a functional group X, (B) a stain-proofing component, and (C) a curing agent, wherein the stain-proofing component (B) is (B1) a liquid polydialkylsiloxane having a functional group $Y^1$ being capable of reacting with the functional groups X and Z or the curing agent (C) or (B2) a liquid fluoropolyether having a functional group $Y^2$ being capable of reacting with the functional groups X and Z or the curing agent (C).

CITATION LIST

Patent Literature

Patent Literature 1: WO 2004/067658

SUMMARY

The disclosure provides a modified polymer (hereinafter, also referred to as a "first modified polymer of the disclosure") including:
(a) a main chain containing a fluorine-containing polymer; and
(b) a side chain represented by the following formula (b1') and/or a side chain represented by the following formula (b2'),
the formula (b1') being:

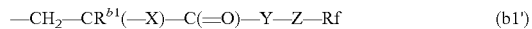

wherein
X is a hydrogen atom, a methyl group, or a halogen atom;
Y is —O— or —NH—;
Z is a direct bond or a divalent organic group;
Rf is a C1-C20 fluoroalkyl group; and
$R^{b1}$ is a hydrogen atom or a monovalent organic group,
the formula (b2') being:

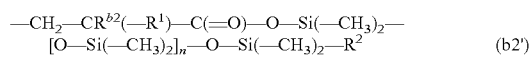

wherein
$R^1$ is a hydrogen atom or a methyl group;
$R^2$ is a hydrogen atom or a methyl group;
$R^{b2}$ is a hydrogen atom or a monovalent organic group; and
n is 3 to 200.

Advantageous Effects

The modified polymer of the disclosure has the aforementioned structure and thus has excellent antifouling properties.

DESCRIPTION OF EMBODIMENTS

Hereinafter, the modified polymer of the disclosure is described in detail.

As disclosed in Patent Literature 1, antifouling components are added to a synthetic resin to improve the antifouling properties in conventional techniques. Unfortunately, such techniques fail to give sufficiently improved antifouling properties. The modified polymer of the disclosure has been completed in response to the finding that the presence of the main chain containing a fluorine-containing polymer and a specific side chain allows the fluorine-containing polymer to have excellent antifouling properties.

Hereinafter, the modified polymer of the disclosure is described in more detail.

The first modified polymer of the disclosure includes a main chain (a) containing a fluorine-containing polymer. The fluorine-containing polymer is known as a resin having excellent properties such as heat resistance, chemical resistance, and weather resistance. In addition to such excellent properties that the fluorine-containing polymer originally has, such as heat resistance, chemical resistance, and weather resistance, the modified polymer of the disclosure also has excellent antifouling properties as a result of having a specific side chain (b).

The fluorine-containing polymer preferably contains a unit represented by —CHR— (wherein R is a hydrogen atom or a monovalent organic group). Containing at least one —CHR— bond in the main chain is sufficient. The fluorine-containing polymer also preferably contains a polymerized unit —CH$_2$—CHR—.

In the unit represented by —CHR—, R is a hydrogen atom or a monovalent organic group.

The monovalent organic group includes
an alkyl group optionally containing one or more substituents,
an alkenyl group optionally containing one or more substituents,
an alkynyl group optionally containing one or more substituents,
a cycloalkyl group optionally containing one or more substituents,
a cycloalkenyl group optionally containing one or more substituents,
a cycloalkadienyl group optionally containing one or more substituents,
an aryl group optionally containing one or more substituents,
an aralkyl group optionally containing one or more substituents,
a non-aromatic heterocyclic group optionally containing one or more substituents,
a heteroaryl group optionally containing one or more substituents, a cyano group,
a formyl group,
RaO—,
RaCO—,
RaSO$_2$—,
RaCOO—,
RaNRaCO—,
RaCONRa—,
RaOCO—, RaOSO$_2$—, and
RaNRbSO$_2$—
wherein Ras are each individually
an alkyl group optionally containing one or more substituents,
an alkenyl group optionally containing one or more substituents,
an alkynyl group optionally containing one or more substituents,
a cycloalkyl group optionally containing one or more substituents,
a cycloalkenyl group optionally containing one or more substituents,
a cycloalkadienyl group optionally containing one or more substituents,
an aryl group optionally containing one or more substituents,
an aralkyl group optionally containing one or more substituents,
a non-aromatic heterocyclic group optionally containing one or more substituents, or
a heteroaryl group optionally containing one or more substituents, and
Rbs are each independently H or an alkyl group optionally containing one or more substituents.

The organic group is preferably an alkyl group optionally containing one or more substituents.

The "substituent" as used herein means a group that can substitute for an atom or group. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxyamino group, a carbamoylamino group, a sulfamoyl amino group, a halogen atom, a sulfamoyl carbamoyl group, a carbamoyl sulfamoyl group, a dialiphatic oxyphosphinyl group, and a diaromatic oxyphosphinyl group.

The aliphatic group may be either saturated or unsaturated, and may contain a group selected from, for example, a hydroxy group, an aliphatic oxy group, a carbamoyl group, an aliphatic oxycarbonyl group, an aliphatic thio group, an amino group, an aliphatic amino group, an acylamino group, and a carbamoylamino group. Examples of the aliphatic group include an alkyl group having a total carbon number of 1 to 8, preferably 1 to 4, such as a methyl group, an ethyl group, a vinyl group, a cyclohexyl group, and a carbamoylmethyl group.

The aromatic group may contain a group selected from, for example, a nitro group, a halogen atom, an aliphatic oxy group, a carbamoyl group, an aliphatic oxycarbonyl group, an aliphatic thio group, an amino group, an aliphatic amino group, an acylamino group, and a carbamoylamino group. Examples of the aromatic group include an aryl group having a carbon number of 6 to 12, preferably having a total carbon number of 6 to 10, such as a phenyl group, a 4-nitrophenyl group, a 4-acetylaminophenyl group, and a 4-methanesulfonylphenyl group.

The heterocyclic group may contain a group selected from, for example, a halogen atom, a hydroxy group, an aliphatic oxy group, a carbamoyl group, an aliphatic oxycarbonyl group, an aliphatic thio group, an amino group, an aliphatic amino group, an acylamino group, and a carbamoylamino group. Examples of the heterocyclic group include a 5- to 6-membered hetero ring having a total carbon number of 2 to 12, preferably 2 to 10, such as a 2-tetrahydrofuryl group and a 2-pyrimidyl group.

The acyl group may contain a group selected from, for example, an aliphatic carbonyl group, an aryl carbonyl group, a heterocyclic carbonyl group, a hydroxy group, a halogen atom, an aromatic group, an aliphatic oxy group, a carbamoyl group, an aliphatic oxycarbonyl group, an aliphatic thio group, an amino group, an aliphatic amino group, an acylamino group, and a carbamoylamino group. Examples of the acyl group include an acyl group having a total carbon number of 2 to 8, preferably 2 to 4, such as an acetyl group, a propanoyl group, a benzoyl group, and a 3-pyridinecarbonyl group.

The acylamino group may contain a group selected from, for example, an aliphatic group, an aromatic group, and a heterocyclic group, such as an acetylamino group, a benzoylamino group, a 2-pyridinecarbonylamino group, and a propanoylamino group. Examples of the acylamino group include an acylamino group having a total carbon number of 2 to 12, preferably 2 to 8, and an alkylcarbonylamino group having a total carbon number of 2 to 8, such as an acetylamino group, a benzoylamino group, a 2-pyridinecarbonylamino group, and a propanoylamino group.

The aliphatic oxycarbonyl group may be either saturated or unsaturated, and may contain a group selected from, for example, a hydroxy group, an aliphatic oxy group, a carbamoyl group, an aliphatic oxycarbonyl group, an aliphatic thio group, an amino group, an aliphatic amino group, an acylamino group, and a carbamoylamino group. Examples of the aliphatic oxycarbonyl group include an alkoxycarbonyl group having a total carbon number of 2 to 8, preferably 2 to 4, such as a methoxycarbonyl group, an ethoxycarbonyl group, and a (t)-butoxycarbonyl group.

The carbamoyl group may contain a group selected from, for example, an aliphatic group, an aromatic group, and a heterocyclic group. Examples of the carbamoyl group include an unsubstituted carbamoyl group and an alkylcarbamoyl group having a total carbon number of 2 to 9, preferably an unsubstituted carbamoyl group and an alkylcarbamoyl group having a total carbon number of 2 to 5, such as a N-methylcarbamoyl group, a N,N-dimethylcarbamoyl group, and a N-phenylcarbamoyl group.

The aliphatic sulfonyl group may be either saturated or unsaturated, and may contain a group selected from, for example, a hydroxy group, an aromatic group, an aliphatic oxy group, a carbamoyl group, an aliphatic oxycarbonyl group, an aliphatic thio group, an amino group, an aliphatic amino group, an acylamino group, and a carbamoylamino group. Examples of the aliphatic sulfonyl group include an alkylsulfonyl group having a total carbon number of 1 to 6, preferably a total carbon number of 1 to 4, such as methanesulfonyl.

The aromatic sulfonyl group may contain a group selected from, for example, a hydroxy group, an aliphatic group, an aliphatic oxy group, a carbamoyl group, an aliphatic oxycarbonyl group, an aliphatic thio group, an amino group, an aliphatic amino group, an acylamino group, and a carbamoylamino group. Examples of the aromatic sulfonyl group include an aryl sulfonyl group having a total carbon number of 6 to 10, such as benzenesulfonyl.

The amino group may contain a group selected from, for example, an aliphatic group, an aromatic group, and a heterocyclic group.

The acylamino group may contain a group selected from, for example, an acetylamino group, a benzoylamino group, a 2-pyridinecarbonylamino group, and a propanoylamino group. Examples of the acylamino group include an acylamino group having a total carbon number of 2 to 12, preferably a total carbon number of 2 to 8, more preferably an alkylcarbonylamino group having a total carbon number of 2 to 8, such as an acetylamino group, a benzoylamino group, a 2-pyridinecarbonylamino group, and a propanoylamino group.

The aliphatic sulfonamide group, aromatic sulfonamide group, and heterocyclic sulfonamide group may be, for example, a methanesulfonamide group, a benzenesulfonamide group, and a 2-pyridinesulfonamide group.

The sulfamoyl group may contain a group selected from, for example, an aliphatic group, an aromatic group, and a heterocyclic group. Examples of the sulfamoyl group include a sulfamoyl group, an alkylsulfamoyl group having a total carbon number of 1 to 9, a dialkylsulfamoyl group having a total carbon number of 2 to 10, an aryl sulfamoyl group having a total carbon number of 7 to 13, and a heterocyclic sulfamoyl group having a total carbon number of 2 to 12, more preferably a sulfamoyl group, an alkylsulfamoyl group having a total carbon number of 1 to 7, a dialkylsulfamoyl group having a total carbon number of 3 to 6, an aryl sulfamoyl group having a total carbon number of 6 to 11, and a heterocyclic sulfamoyl group having a total carbon number of 2 to 10, such as a sulfamoyl group, a methylsulfamoyl group, a N,N-dimethylsulfamoyl group, a phenylsulfamoyl group, and a 4-pyridinesulfamoyl group.

The aliphatic oxy group may be either saturated or unsaturated, and may contain a group selected from, for example, a methoxy group, an ethoxy group, an i-propyloxy group, a cyclohexyloxy group, and a methoxyethoxy group. Examples of the aliphatic oxy group include an alkoxy group having a total carbon number of 1 to 8, preferably 1 to 6, such as a methoxy group, an ethoxy group, an i-propyloxy group, a cyclohexyloxy group, and a methoxyethoxy group.

The aromatic amino group and the heterocyclic amino group may contain a group selected from, for example, an aliphatic group, an aliphatic oxy group, a halogen atom, a carbamoyl group, a heterocyclic group fused with the aryl group, an aliphatic oxycarbonyl group, preferably an aliphatic group having a total carbon number of 1 to 4, an aliphatic oxy group having a total carbon number of 1 to 4, a halogen atom, a carbamoyl group having a total carbon number of 1 to 4, a nitro group, and an aliphatic oxycarbonyl group having a total carbon number of 2 to 4.

The aliphatic thio group may be either saturated or unsaturated. Examples thereof include an alkylthio group having a total carbon number of 1 to 8, more preferably a total carbon number of 1 to 6, such as a methylthio group, an ethylthio group, a carbamoylmethylthio group, and a t-butylthio group.

The carbamoylamino group may contain a group selected from, for example, an aliphatic group, an aryl group, and a heterocyclic group. Examples of the carbamoylamino group include a carbamoylamino group, an alkylcarbamoylamino group having a total carbon number of 2 to 9, a dialkylcarbamoylamino group having a total carbon number of 3 to 10, an aryl carbamoylamino group having a total carbon number of 7 to 13, and a heterocyclic carbamoylamino group having a total carbon number of 3 to 12, preferably a carbamoylamino group, an alkylcarbamoylamino group having a total carbon number of 2 to 7, a dialkylcarbamoylamino group having a total carbon number of 3 to 6, an aryl carbamoylamino group having a total carbon number of 7 to 11, and a heterocyclic carbamoylamino group having a total carbon number of 3 to 10, such as a carbamoylamino group, a methylcarbamoylamino group, a N,N-dimethylcarbamoylamino group, phenylcarbamoylamino, and a 4-pyridinecarbamoylamino group.

R is preferably a functional group-containing group. Examples of the functional group include a hydroxy group (excluding the hydroxy group contained in the carboxyl group; the same applies hereinbelow), a carboxyl group, an ester bond (—OCO—), a group represented by —COOCO—, a cyano group, an amino group, an epoxy group, and a silyl group. Preferred among these is at least one selected from the group consisting of a hydroxy group, a carboxyl group, an ester bond, a group represented by —COOCO—, an amino group, a cyano group, and a silyl group. More preferred is at least one selected from the group consisting of a hydroxy group, a carboxyl group, an ester bond, an amino group, and a silyl group. Still more preferred is at least one selected from the group consisting of a hydroxy group, a carboxyl group, an ester bond, and an amino group. Particularly preferred is at least one selected from the group consisting of a hydroxy group, an ester bond, and a carboxyl group. Specific examples of R include a carboxyl group, —O$_p$—R$^d_q$—OH (wherein R$^d$ is a C1-C10 linear or branched alkylene group; p is 0 or 1; and q is 0 or 1), and —OCO—R$^e$ (wherein R$^e$ is a C1-C10 hydrocarbon group). R$^e$ may be a linear or branched hydrocarbon group (e.g., an alkyl group) or may be a cyclic hydrocarbon group (e.g., a cycloalkyl group, a phenyl group).

R is preferably a curable functional group-containing group. Examples of the curable functional group include a hydroxy group, a carboxyl group, a group represented by —COOCO—, a cyano group, an amino group, an epoxy group, and a silyl group. In terms of good curing reactivity, preferred among these is at least one selected from the group consisting of a hydroxy group, a carboxyl group, a group represented by —COOCO—, an amino group, a cyano group, and a silyl group. More preferred is at least one selected from the group consisting of a hydroxy group, a carboxyl group, an amino group, and a silyl group. Still more preferred is at least one selected from the group consisting of a hydroxy group, a carboxyl group, and an amino group. Particularly preferred is at least one selected from the group consisting of a hydroxy group and a carboxyl group. These curable functional groups are commonly introduced into a fluorine-containing polymer by copolymerization with a monomer containing a curable functional group.

In order to achieve excellent weather resistance, the fluorine-containing polymer is preferably a curable functional group-containing fluorine-containing polymer. An example of the curable functional group-containing fluorine-containing polymer is a polymer obtainable by introducing a curable functional group into a fluorine-containing polymer. This structure enables better balance between weather resistance and antifouling properties. The curable functional group-containing fluorine-containing polymer encompasses a resin polymer having an obvious melting point, an elastomeric polymer having rubber elasticity, and a thermoplastic elastomeric polymer therebetween.

In order to achieve excellent weather resistance and to easily dissolve in an ester solvent, the fluorine-containing polymer preferably contains a fluorine-containing monomer unit, a vinyl ester unit containing neither a hydroxy group nor an aromatic ring, and a hydroxy group-containing monomer unit. This structure enables better balance between weather resistance and antifouling properties.

Examples of the fluorine-containing monomer constituting the fluorine-containing monomer unit include tetrafluoroethylene, chlorotrifluoroethylene, vinylidene fluoride, vinyl fluoride, and fluorovinyl ether. One or two or more of these may be used.

In terms of excellent weather resistance, the fluorine-containing monomer preferably includes at least one selected from the group consisting of tetrafluoroethylene, chlorotrifluoroethylene, and vinylidene fluoride, more preferably at least one selected from the group consisting of tetrafluoroethylene and chlorotrifluoroethylene. This structure enables better balance between weather resistance and antifouling properties.

The vinyl ester constituting the vinyl ester unit preferably includes a vinyl carboxylate, more preferably at least one selected from the group consisting of vinyl acetate, vinyl propionate, vinyl butyrate, vinyl isobutyrate, vinyl pivalate, vinyl caproate, vinyl versatate, vinyl laurate, vinyl stearate, and vinyl cyclohexylcarboxylate, still more preferably at least one selected from the group consisting of vinyl acetate, vinyl versatate, vinyl laurate, vinyl stearate, and vinyl cyclohexylcarboxylate, particularly preferably at least one selected from the group consisting of vinyl acetate and vinyl versatate.

In order to achieve much better adhesion and abrasion resistance, the vinyl ester is preferably a vinyl carboxylate in which the carboxylic acid has a carbon number of 6 or greater, more preferably a vinyl carboxylate in which the carboxylic acid has a carbon number of 9 or greater. The upper limit of the carbon number of the carboxylic acid in the vinyl carboxylate is preferably 20, more preferably 15. In order to achieve excellent adhesion to a substrate, most preferred are vinyl versatates such as vinyl neononanoate and vinyl neodecanoate.

The vinyl ester contains neither a hydroxy group nor an aromatic ring. The vinyl ester preferably contains no halogen atom.

The hydroxy group-containing monomer constituting the hydroxy group-containing monomer unit preferably includes at least one selected from the group consisting of a hydroxyalkyl vinyl ether, a hydroxyalkyl allyl ether, a vinyl hydroxycarboxylate, an allyl hydroxycarboxylate, and a hydroxyalkyl (meth)acrylate, more preferably at least one selected from the group consisting of a hydroxyalkyl vinyl ether and a hydroxyalkyl allyl ether, and is still more preferably a hydroxyalkyl vinyl ether.

Examples of the hydroxyalkyl vinyl ether include 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, and 6-hydroxyhexyl vinyl ether.

Examples of the hydroxyalkyl allyl ether include 2-hydroxyethyl allyl ether, 4-hydroxybutyl allyl ether, and glycerol monoallyl ether.

Examples of the vinyl hydroxycarboxylate include vinyl hydroxyacetate, vinyl hydroxypropanoate, vinyl hydroxybutanoate, vinyl hydroxyhexanoate, and vinyl 4-hydroxycyclohexylacetate.

Examples of the allyl hydroxycarboxylate include allyl hydroxyacetate, allyl hydroxypropanoate, allyl hydroxybutanoate, allyl hydroxyhexanoate, and allyl 4-hydroxycyclohexylacetate.

Examples of the hydroxyalkyl (meth)acrylate include 2-hydroxyethyl acrylate and 2-hydroxyethyl methacrylate.

In particular, the hydroxy group-containing monomer is still more preferably one represented by

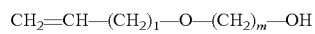 Formula (A):

(wherein 1 is 0 or 1; and m is an integer of 2 to 20), and particularly preferably includes at least one monomer selected from the group consisting of 4-hydroxybutyl vinyl ether, 2-hydroxyethyl vinyl ether, 2-hydroxyethyl allyl ether, and 4-hydroxybutyl allyl ether.

The fluorine-containing monomer unit is preferably contained in an amount of 30 to 60 mol %, more preferably 40 to 55 mol % of all monomer units of the fluorine-containing polymer.

The vinyl ester unit containing neither a hydroxy group nor an aromatic ring is preferably contained in an amount of 1 to 40 mol %, more preferably 10 to 30 mol % of all monomer units of the fluorine-containing polymer.

The hydroxy group-containing monomer unit is preferably contained in an amount of 15 to 40 mol %, more preferably 20 to 35 mol % of all monomer units of the fluorine-containing polymer.

Herein, the amounts of the respective monomer units constituting the fluorine-containing polymer can be calculated by appropriate combination of NMR, FT-IR, elemental analysis, and X-ray fluorescence analysis in accordance with the types of the monomers.

The fluorine-containing polymer preferably has a number average molecular weight of 3000 to 100000. The number average molecular weight is more preferably 5000 or higher, still more preferably 8000 or higher, while more preferably 50000 or lower, still more preferably 35000 or lower. Too lower a number average molecular weight may cause poor weather resistance, poor solvent resistance, and poor stain resistance, as well as failure in forming a coating film having high hardness. Too high a number average molecular weight may cause high viscosity when the polymer is processed into a coating material, which may make the coating material difficult to handle. The number average molecular weight can be measured by gel permeation chromatography (GPC) using tetrahydrofuran as an eluent.

The fluorine-containing polymer preferably has a glass transition temperature (second run) of 10° C. to 70° C., more preferably 15° C. to 60° C., determined using a differential scanning calorimeter (DSC). Too low a glass transition temperature may cause poor weather resistance, poor solvent resistance, and poor stain resistance, as well as failure in forming a coating film having high hardness. Too high a glass transition temperature may cause high viscosity when the polymer is processed into a coating material, which may make the coating material difficult to handle.

In order to achieve good miscibility with substances such as a polyisocyanate compound and a pigment, the fluorine-containing polymer preferably has an acid value of 0.6 to 50 mgKOH/g, more preferably 2 to 30 mgKOH/g.

The fluorine-containing polymer may further contain a monomer unit different from the fluorine-containing monomer unit, the vinyl ester unit containing neither a hydroxy group nor an aromatic ring, and the hydroxy group-containing monomer unit. For example, the fluorine-containing polymer may contain any of units such as a vinyl carboxylate containing an aromatic ring and no hydroxy group, a carboxyl group-containing monomer, an amino group-containing monomer, a hydrolyzable silyl group-containing monomer, an alkyl vinyl ether containing no hydroxy group, and an olefin containing neither a halogen atom nor a hydroxy group. These monomer units may be contained in an amount of 0 to 10 mol %, preferably 0.1 to 5 mol %, more preferably 0.5 to 3 mol % of all monomer units of the fluorine-containing polymer.

Examples of the vinyl carboxylate containing an aromatic ring and no hydroxy group include vinyl benzoate and vinyl para-t-butylbenzoate.

The carboxyl group-containing monomer preferably includes one represented by

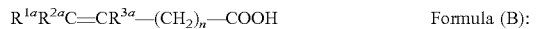

$$R^{1a}R^{2a}C=CR^{3a}-(CH_2)_n-COOH \quad \text{Formula (B):}$$

wherein $R^{1a}$, $R^{2a}$, and $R^{3a}$ are the same as or different from each other and are each a hydrogen atom or a C1-C10 linear or branched alkyl group; and n is an integer of 0 or greater). Examples thereof include acrylic acid, methacrylic acid, vinylacetic acid, crotonic acid, pentenoic acid, hexenoic acid, heptenoic acid, octenoic acid, nonenoic acid, decenoic acid, undecylenic acid, dodecenoic acid, tridecenoic acid, tetradecenoic acid, pentadecenoic acid, hexadecenoic acid, heptadecenoic acid, octadecenoic acid, nonadecenoic acid, eicosenoic acid, and 22-tricosenoic acid. Preferred among these is at least one selected from the group consisting of acrylic acid, crotonic acid, and undecylenic acid, more preferred is at least one selected from the group consisting of acrylic acid and crotonic acid.

Examples of the carboxyl group-containing monomer also include cinnamic acid, 3-allyloxypropionic acid, itaconic acid, itaconic acid monoester, maleic acid, maleic acid monoester, maleic acid anhydride, fumaric acid, fumaric acid monoester, vinyl phthalate, vinyl pyromellitate, citraconic acid, mesaconic acid, and aconitic acid.

Examples of the amino group-containing monomer include amino vinyl ethers represented by $CH_2=CH-O-(CH_2)_x-NH_2$ (x=0 to 10); amines represented by $CH_2=CH-O-CO(CH_2)_x-NH_2$ (x=1 to 10); as well as aminomethylstyrene, vinylamine, acrylamide, vinylacetamide, and vinylformamide.

Examples of the hydrolyzable silyl group-containing monomer include (meth)acrylic acid esters such as $CH_2=CHCO_2(CH_2)_3Si(OCH_3)_3$, $CH_2=CHCO_2(CH_2)_3Si(OC_2H_5)_3$, $CH_2=C(CH_3)CO_2(CH_2)_3Si(OCH_3)_3$, $CH_2=C(CH_3)CO_2(CH_2)_3Si(OC_2H_5)_3$, $CH_2=CHCO_2(CH_2)_3SiCH_3(OC_2H_5)_2$, $CH_2=C(CH_3)CO_2(CH_2)_3SiC_2H_5(OCH_3)_2$, $CH_2=C(CH_3)CO_2(CH_2)_3Si(CH_3)_2(OC_2H_5)$, $CH_2=C(CH_3)CO_2(CH_2)_3Si(CH_3)_2OH$, $CH_2=CH(CH_2)_3Si(OCOCH_3)_3$, $CH_2=C(CH_3)CO_2(CH_2)_3SiC_2H_5(OCOCH_3)_2$, $CH_2=C(CH_3)CO_2(CH_2)_3SiCH_3(N(CH_3)COCH_3)_2$, $CH_2=CHCO_2(CH_2)_3SiCH_3[ON(CH_3) C_2H_5]_2$, and $CH_2=C(CH_3)CO_2(CH_2)_3SiC_6H_5[ON(CH_3) C_2H_5]_2$; vinylsilanes such as $CH_2=CHSi[ON=C(CH_3)(C_2H_5)]_3$, $CH_2=CHSi(OCH_3)_3$, $CH_2=CHSi(OC_2H_5)_3$, $CH_2=CHSiCH_3(OCH_3)_2$, $CH_2=CHSi(OCOCH_3)_3$, $CH_2=CHSi(CH_3)_2(OC_2H_5)$, $CH_2=CHSi(CH_3)_2SiCH_3(OCH_3)_2$, $CH_2=CHSiC_2H_5(OCOCH_3)_2$, $CH_2=CHSiCH_3[ON(CH_3)C_2H_5]_2$, and vinyltrichlorosilane or partially hydrolyzed products thereof; and vinyl ethers such as trimethoxysilylethyl vinyl ether, triethoxysilylethyl vinyl ether, trimethoxysilylbutyl vinyl ether, methyldimethoxysilylethyl vinyl ether, trimethoxysilylpropyl vinyl ether, and triethoxysilylpropyl vinyl ether.

Examples of the alkyl vinyl ether containing no hydroxy group include methyl vinyl ether, ethyl vinyl ether, n-propyl vinyl ether, n-butyl vinyl ether, octadecyl vinyl ether, 2-ethylhexyl vinyl ether, cyclohexyl vinyl ether, isopropyl vinyl ether, and isobutyl vinyl ether. Preferred among these is at least one selected from the group consisting of ethyl vinyl ether and cyclohexyl vinyl ether.

Examples of the olefin include non-fluorine-based olefins such as ethylene, propylene, n-butene, and isobutene.

The fluorine-containing polymer preferably has a hydroxyl value of 50 mgKOH/g or higher. The hydroxyl value is more preferably 55 mgKOH/g or higher, more preferably 60 mgKOH/g or higher, still more preferably 80 mgKOH/g or higher, particularly preferably 100 mgKOH/g or higher, while preferably 180 mgKOH/g or lower, more preferably 170 mgKOH/g or lower, still more preferably 160 mgKOH/g or lower, particularly preferably 150 mgKOH/g or lower.

The hydroxyl value is determined by calculation from the weight and number of moles of —OH groups of the fluorine-containing polymer. The number of moles of —OH groups can be determined by NMR measurement, IR measurement, titration, or elemental analysis, for example.

The fluorine-containing polymer can be produced by solution polymerization, emulsion polymerization, suspension polymerization, or bulk polymerization. Preferred among these is one produced by solution polymerization.

The fluorine-containing polymer is preferably produced by polymerizing monomers to give the above units by solution polymerization in which an organic solvent and a polymerization initiator are used. The polymerization temperature is commonly 0° C. to 150° C., preferably 5° C. to 95° C. The polymerization pressure is commonly 0.1 to 10 MPaG (1 to 100 kgf/cm²G).

Examples of the organic solvent include esters such as methyl acetate, ethyl acetate, propyl acetate, n-butyl acetate, and tert-butyl acetate; ketones such as acetone, methyl ethyl ketone, and cyclohexanone; aliphatic hydrocarbons such as hexane, cyclohexane, octane, nonane, decane, undecane, dodecane, and mineral spirits; aromatic hydrocarbons such as benzene, toluene, xylene, naphthalene, and solvent naphtha; alcohols such as methanol, ethanol, tert-butanol, isopropanol, and ethylene glycol monoalkyl ether; cyclic ethers such as tetrahydrofuran, tetrahydropyran, and dioxane; dimethyl sulfoxide; and mixtures of any of these.

Examples of the polymerization initiator include persulfates such as ammonium persulfate and potassium persulfate (if necessary, a reducing agent such as sodium hydrogen sulfite, sodium pyrosulfite, cobalt naphthenate, or dimethylaniline may be used together); redox initiators each composed of an oxidizing agent (e.g., ammonium peroxide, potassium peroxide), a reducing agent (e.g., sodium sulfite) and a transition metal salt (e.g., iron sulfate); diacyl peroxides such as acetyl peroxide and benzoyl peroxide; dialkoxycarbonyl peroxides such as isopropoxycarbonyl peroxide and tert-butoxycarbonyl peroxide; ketone peroxides such as methyl ethyl ketone peroxide and cyclohexanone peroxide; hydroperoxides such as hydrogen peroxide, tert-butyl hydroperoxide, and cumene hydroperoxide; dialkyl peroxides such as di-tert-butyl peroxide and dicumyl peroxide; alkyl peroxy esters such as tert-butyl peroxyacetate and tert-butyl peroxypivalate; and azo compounds such as 2,2'-azobisisobutyronitrile, 2,2'-azobis(2,4-dimethylvaleronitrile), 2,2'-azobis(2-methylvaleronitrile), 2,2'-azobis(2-cyclopropylpropionitrile), dimethyl 2,2'-azobisisobutyrate, 2,2'-azobis[2-(hydroxymethyl)propionitrile], and 4,4'-azobis (4-cyanopentenoic acid).

The first modified polymer of the disclosure includes a side chain (b) represented by the following formula (b1') and/or a side chain (b) represented by the following formula (b2'), $$—CH_2—CR^{b1}(—X)—C(=O)—Y—Z—Rf \quad (b1')$$

wherein
X is a hydrogen atom, a methyl group, or a halogen atom;
Y is —O— or —NH—;
Z is a direct bond or a divalent organic group;
Rf is a $C_1$-$C_{20}$ fluoroalkyl group; and
$R^{b1}$ is a hydrogen atom or a monovalent organic group, $$—CH_2—CR^{b2}(—R^1)—C(=O)—O—Si(—CH_3)_2— \\ [O—Si(—CH_3)_2]_n—O—Si(—CH_3)_2—R^2 \quad (b2')$$

wherein
$R^1$ is a hydrogen atom or a methyl group;
$R^2$ is a hydrogen atom or a methyl group;
$R^{b2}$ is a hydrogen atom or a monovalent organic group; and
n is 3 to 200.

The presence of a specific side chain (b) allows the fluorine-containing polymer to have excellent antifouling properties.

In the formula (b1'), X is a hydrogen atom, a methyl group, or a halogen atom. X may be a hydrogen atom, a methyl group, a fluorine atom, a chlorine atom, a bromine atom, or an iodine atom.

Y is preferably —O—.

For example, Z may be a direct bond, a C1-C20 linear or branched aliphatic group (especially, an alkylene group), such as a group represented by the formula —$(CH_2)_x$— (wherein x is 1 to 10), a group represented by the formula —$R^2$ $(R^1)N—SO_2$— or the formula —$R^2$ $(R^1)N—CO$— (wherein $R^1$ is a $C_1$-$C_{10}$ alkyl group; and $R^2$ is a $C_1$-$C_{10}$ linear alkylene group or branched alkylene group), a group represented by the formula —$CH_2CH(OR^3)CH_2$—$(Ar—O)_p$— (wherein $R^3$ is a hydrogen atom or a C1-C10 acyl group (e.g., formyl or acetyl); Ar is an arylene group optionally containing a substituent; and p is 0 or 1), a group represented by the formula —$CH_2$—$Ar$—$(O)_q$— (wherein Ar is an arylene group optionally containing a substituent; and q is 0 or 1), a —$(CH_2)_m$—$SO_2$—$(CH_2)_n$— group, or a —$(CH_2)_m$—S—$(CH_2)_n$— group (wherein m is 1 to 10; and n is 0 to 10).

Z is preferably a C1-C10 aliphatic group, a C6-C18 aromatic group, a cycloaliphatic group, a —$CH_2CH_2N(R^1)SO_2$— group (wherein $R^1$ is a C1-C4 alkyl group), a —$CH_2CH(OZ^1)CH_2$—$(Ph-O)_p$— group (wherein $Z^1$ is a hydrogen atom or an acetyl group; Ph is a phenylene group; and p is 0 or 1), a —$(CH_2)_n$-Ph-O— group (wherein Ph is a phenylene group; and n is 0 to 10), and a —$(CH_2)_m$—$SO_2$—$(CH_2)_n$— group or a —$(CH_2)_m$—S—$(CH_2)_n$— group (wherein m is 1 to 10; and n is 0 to 10). The aliphatic group is preferably an alkylene group (especially, C1-C4, e.g., C1 or C2). The aromatic group or cycloaliphatic group may be substituted or unsubstituted. The S group or $SO_2$ group may be directly bonded to the Rf group.

The Rf group is preferably a perfluoroalkyl group. The Rf group has a carbon number of 1 to 20, preferably 1 to 6, more preferably 4 to 6, particularly 6. The fluorine-containing monomer used may be one in which the Rf group has a carbon number of 1 to 20. Still, the fluorine-containing monomer preferably consists of a compound in which the Rf group has a carbon number of 4 to 6, particularly 6. Examples of the Rf group include —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)$ $CF_2CF_2CF_3$, —$(CF_2)_5CF_3$, —$(CF_2)_3CF(CF_3)_2$, —$(CF_2)_4CF(CF_3)_2$, and —$C_8F_{17}$.

$R^{b1}$ is a hydrogen atom or a monovalent organic group, preferably a hydrogen atom. The monovalent organic group may be one represented by the following formula (b1") or (b2"), $$—CH_2—CH(—X)—C(=O)—Y—Z—Rf \quad (b1")$$

wherein
X is a hydrogen atom, a methyl group, or a halogen atom;
Y is —O— or —NH—;
Z is a direct bond or a divalent organic group; and
Rf is a C1-C20 fluoroalkyl group, $$—CH_2—CH(—R^1)—C(=O)—O—Si(—CH_3)_2— \\ [O—Si(—CH_3)_2]_n—O—Si(—CH_3)_2—R^2 \quad (b2")$$

wherein
$R^1$ is a hydrogen atom or a methyl group;
$R^2$ is a hydrogen atom or a methyl group; and
n is 3 to 200.

Specific examples of the side chain represented by the formula (b1') include, but are not limited to, the following.

$$—CH_2—CH_2—C(=O)—O—(CH_2)_2—Rf$$

$$—CH_2—CH_2—C(=O)—O—C_6H_4—Rf$$

$$—CH_2—CH_2—C(=O)—O—(CH_2)_2N(—CH_3) \\ SO_2—Rf$$

$$—CH_2—CH_2—C(=O)—O—(CH_2)_2N(—C_2H_5) \\ SO_2—Rf$$

$$—CH_2—CH_2—C(=O)—O—CH_2CH(—OH)CH_2— \\ Rf$$

$$—CH_2—CH_2—C(=O)—O—CH_2CH(—OCOCH_3) \\ CH_2—Rf$$

$$—CH_2—CH_2—C(=O)—O—(CH_2)_2—S—Rf$$

$$—CH_2—CH_2—C(=O)—O—(CH_2)_2—S—(CH_2)_2— \\ Rf$$

$$—CH_2—CH_2—C(=O)—O—(CH_2)_3—SO_2—Rf$$

$$—CH_2—CH_2—C(=O)—O—(CH_2)_2—SO_2— \\ (CH_2)_2—Rf$$

$$—CH_2—CH_2—C(=O)—NH—(CH_2)_2—Rf$$

In the formulas, Rf is a C1-C20 fluoroalkyl group.

Next, the side chain represented by the formula (b2') is described.

In the formula (b2'), $R^1$ is a hydrogen atom or a methyl group, preferably a hydrogen atom.

In the formula (b2'), $R^2$ is a hydrogen atom or a methyl group, preferably a methyl group.

In the formula (b2'), $R^{b2}$ is a hydrogen atom or a monovalent organic group, preferably a hydrogen atom. The monovalent organic group may be one represented by the following formula (b1") or (b2"), $$—CH_2—CH(—X)—C(=O)—Y—Z—Rf \quad (b1")$$

wherein
X is a hydrogen atom, a methyl group, or a halogen atom;
Y is —O— or —NH—;
Z is a direct bond or a divalent organic group; and
Rf is a C1-C20 fluoroalkyl group, —CH$_2$—CH(—R$^1$)—C(=O)—O—Si(—CH$_3$)$_2$—[O—Si(—CH$_3$)$_2$]$_n$—O—Si(—CH$_3$)$_2$—R$^2$     (b2'')

wherein
R$^1$ is a hydrogen atom or a methyl group;
R$^2$ is a hydrogen atom or a methyl group; and
n is 3 to 200.

In the formula, n is 3 to 200, preferably 5 to 200, more preferably 9 to 200.

The side chain represented by the formula (b2') may have either a low molecular weight or a high molecular weight. In terms of miscibility, to have a low molecular weight is preferred. In the case of having a low molecular weight, n is preferably 3 to 100, more preferably 5 to 80, still more preferably 9 to 70. In terms of water- and oil-repellency, to have a high molecular weight is preferred.

In the case of having a high molecular weight, n is preferably 100 to 200, more preferably 120 to 200, still more preferably 140 to 200.

Specific examples of the formula (b2'), include, but are not limited to, the following:

—CH$_2$—CH$_2$—C(=O)—O—Si(—CH$_3$)$_2$—[O—Si(—CH$_3$)$_2$]$_n$—O—Si(—CH$_3$)$_2$—H;

—CH$_2$—CH$_2$—C(=O)—O—Si(—CH$_3$)$_2$—[O—Si(—CH$_3$)$_2$]$_n$—O—Si(—CH$_3$)$_2$—CH$_3$;

—CH$_2$—CH(—CH$_3$)—C(=O)—O—Si(—CH$_3$)$_2$—[O—Si(—CH$_3$)$_2$]$_n$—O—Si(—CH$_3$)$_2$—H; and —CH$_2$—CH(—CH$_3$)—C(=O)—O—Si(—CH$_3$)$_2$—[O—Si(—CH$_3$)$_2$]$_n$—O—Si(—CH$_3$)$_2$—CH$_3$ wherein n is 3 to 200.

The side chain (b) preferably has a weight average molecular weight of 300 or more, more preferably 400 or more, still more preferably 600 or more, particularly preferably 800 or more. The molecular weight of the side chain (b) is preferably 20000 or less, more preferably 15000 or less, still more preferably 10000 or less.

In the first modified polymer of the disclosure, the side chain (b) is bonded to a carbon atom of the fluorine-containing polymer constituting the main chain (a). For example, preferably, one hydrogen atom bonded to a carbon atom of the fluorine-containing polymer constituting the main chain (a) is replaced by a side chain (b).

For example, the first modified polymer of the disclosure preferably contains in the main chain (a) a unit represented by —CHR$^a$— or —CRR$^a$—, wherein R$^a$ is a side chain (b); and R is defined as described above.

In the first modified polymer of the disclosure, R$^{b1}$ of the side chain represented by the formula (b1') and R$^{b2}$ of the side chain represented by the formula (b2') each may be a monovalent organic group R$^c$ based on a non-fluorine crosslinkable monomer (c).

The non-fluorine crosslinkable monomer (c) is preferably a non-fluorine crosslinkable (meth)acrylate or (meth)acrylamide monomer.

The non-fluorine crosslinkable monomer (c) is preferably a (meth)acrylate or (meth)acrylamide containing a reactive group. The reactive group is preferably an active hydrogen-containing group or an active hydrogen-reactive group, such as a hydroxy group, an epoxy group, a chloromethyl group, a blocked isocyanate group, an amino group, a carboxyl group, a ketone group, hydrazide group, and a melamine group. The non-fluorine crosslinkable monomer (c) is preferably an active hydrogen-containing monomer (e.g., a monomer containing a hydroxy group, an amino group, a carboxyl group, a ketone group, a hydrazide group, and/or a melamine group) or an active hydrogen-reactive group-containing monomer (e.g., a monomer containing an epoxy group, a chloromethyl group, a blocked isocyanate group, a carboxyl group, and/or a hydrazide group), more preferably an active hydrogen-containing monomer. Particularly preferably, the reactive group is a hydroxy group.

The monovalent organic group R$^c$ based on a (meth)acrylate or (meth)acrylamide containing a reactive group is preferably a group represented by the formula:

—CH$_2$—CHX$^1$—C(=O)—Y$^1$—Z$^1$—W wherein
X$^1$ is a hydrogen atom, a methyl group, or a halogen atom other than a fluorine atom (e.g., a chlorine atom, a bromine atom, and an iodine atom);
Y$^1$ is —O— or —NH—;
Z$^1$ is a direct bond or a divalent organic group; and
W is a hydroxy group, an epoxy group, a chloromethyl group, a blocked isocyanate group, an amino group, a carboxyl group, a ketone group, a hydrazide group, or a melamine group.

The monovalent organic group R$^c$ based on a (meth)acrylate or (meth)acrylamide containing a hydroxy group is particularly preferably a group represented by the formula:

—CH$_2$—CHX$^1$—C(=O)—Y$^1$—Z$^1$—OH wherein
X$^1$ is a hydrogen atom, a methyl group, or a halogen atom other than a fluorine atom (e.g., a chlorine atom, a bromine atom, and an iodine atom);
Y$^1$ is —O— or —NH—; and
Z$^1$ is a direct bond or a divalent organic group.

Z$^1$ may be, for example, a C1-C20 linear or branched aliphatic group (especially, an alkylene group), such as a group represented by the formula —(CH$_2$)$_x$—, wherein x is 1 to 10.

Examples of the non-fluorine crosslinkable monomer (c) include N-methylol (meth)acrylamide, N-2-propanol (meth)acrylamide, N-butylol (meth)acrylamide, hydroxyethyl (meth)acrylate, hydroxybutyl (meth)acrylate, diacetone (meth)acrylamide, 3-chloro-2-hydroxypropyl (meth)acrylate, 2-acetoacetoxyethyl (meth)acrylate, and glycidyl (meth)acrylate.

In order to increase the crosslinkikng density and thereby increase the coating film strength, the non-fluorine crosslinkable monomer (c) is preferably a hydroxy group-containing monomer. The hydroxy group-containing monomer is preferably hydroxyethyl (meth)acrylate or hydroxybutyl (meth)acrylate.

In order to increase the miscibility with a solvent, for example, the non-fluorine crosslinkable monomer (c) is preferably an epoxy group-containing monomer. The epoxy group-containing monomer is preferably glycidyl (meth)acrylate.

In the first modified polymer of the disclosure, the monovalent organic group R$^c$ may be bonded to a carbon atom of the fluorine-containing polymer constituting the main chain (a), and one hydrogen atom bonded to a carbon atom of the fluorine-containing polymer constituting the main chain (a) may be replaced by the monovalent organic group R$^c$.

For example, the first modified polymer of the disclosure may contain in the main chain (a) a unit represented by —CHR$^c$— or —CRR$^c$—, wherein R$^c$ and R are defined as described above.

The first modified polymer of the disclosure preferably has a ratio by mass of the main chain (a) to the side chain (b) (main chain (a)/side chain (b)) of 50/1 to 50/50. The ratio by mass (main chain (a)/side chain (b)) is more preferably 50/1 to 50/30, still more preferably 50/1 to 50/10.

The first modified polymer of the disclosure preferably has a ratio by mass of the main chain (a) to the side chain (c) (main chain (a)/side chain (c)) of 50/1 to 50/50. The ratio by mass (main chain (a)/side chain (b)) is more preferably 50/1 to 50/30, still more preferably 50/1 to 50/10.

The first modified polymer of the disclosure preferably contains 1 to 10 side chains (b), more preferably 8 or less side chains (b), still more preferably 5 or less side chains (b), per main chain (a).

The first modified polymer of the disclosure preferably has a number average molecular weight of 300 to 15000. The number average molecular weight is more preferably 400 or higher, still more preferably 800 or higher, while more preferably 12000 or lower, still more preferably 9000 or lower. Too low a number average molecular weight may cause poor weather resistance, poor solvent resistance, and poor stain resistance, as well as failure in forming a coating film having high hardness. Too high a number average molecular weight may cause high viscosity when the polymer is processed into a coating material, which may make the coating material difficult to handle. The number average molecular weight can be measured by gel permeation chromatography (GPC) using tetrahydrofuran as an eluent.

The first modified polymer of the disclosure can be produced by a method similar to a method for the second modified polymer of the disclosure to be described later.

Accordingly, matters described for the following second modified polymer of the disclosure can be applied to the first modified polymer of the disclosure. Also, the matters described for the first modified polymer of the disclosure can be applied to the second modified polymer of the disclosure.

The second modified polymer of the disclosure contains a main chain based on (a) a fluorine-containing polymer and a side chain based on (b) a monomer represented by the following formula (b1) and/or a monomer represented by the following formula (b2), and is obtainable by reacting the fluorine-containing polymer (a) and the monomer (b) represented by the formula (b1) and/or the monomer (b) represented by the formula (b2) in an organic solvent in the presence of a radical polymerization initiator,

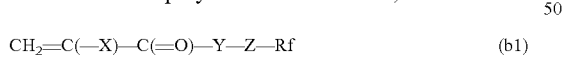

wherein
X is a hydrogen atom, a methyl group, or a halogen atom;
Y is —O— or —NH—;
Z is a direct bond or a divalent organic group; and
Rf is a C1-C20 fluoroalkyl group,

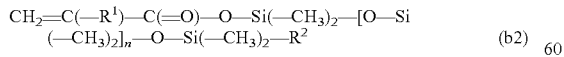

wherein
R$^1$ is a hydrogen atom or a methyl group;
R$^2$ is a hydrogen atom or a methyl group; and
n is 3 to 200.

The fluorine-containing polymer is the same as the fluorine-containing polymer described for the first modified polymer of the disclosure.

The monomer (b1) represented by the formula (b1) is a compound represented by the formula:

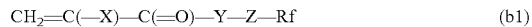

wherein
X is a hydrogen atom, a methyl group, or a halogen atom;
Y is —O— or —NH—;
Z is a direct bond or a divalent organic group; and
Rf is a C1-C20 fluoroalkyl group.

X, Y, Z, and Rf in the formula (b1) are defined in the same manner as X, Y, Z, and Rf in the aforementioned formula (b1'). Preferred embodiments of the latter formula can also be applied to the former formula.

Specific examples of the monomer (b1) include, but are not limited to, the following:

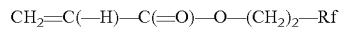

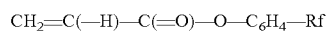

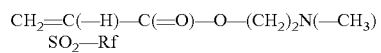

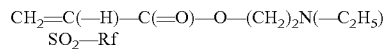

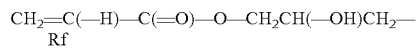

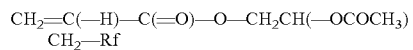

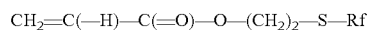

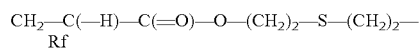

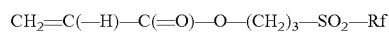

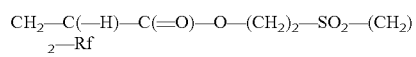

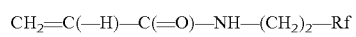

wherein Rf is a C1-C20 fluoroalkyl group.

The monomer (b2) represented by the formula (b2) is a monomer represented by the formula:

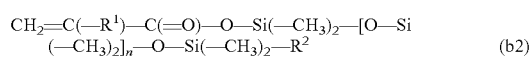

wherein R$^1$ is a hydrogen atom or a methyl group; R$^2$ is a hydrogen atom or a methyl group; and n is 3 to 200.

R$^1$, R$^2$, and n in the formula (b2) are defined in the same manner as R$^1$, R$^2$, and n in the aforementioned formula (b2'). Preferred embodiments of the latter formula can also be applied to the former formula.

Specific examples of the monomer (b2) represented by the formula (b2) include, but are not limited to, the following:

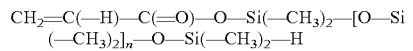

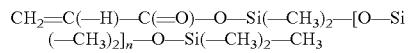

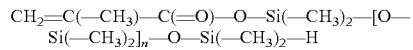

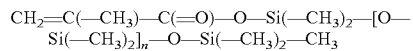

wherein n is 3 to 200.

The monomer (b) preferably has a weight average molecular weight of 300 or more, more preferably 400 or more, still more preferably 600 or more, particularly preferably 800 or more. The molecular weight of the monomer (b) is preferably 20000 or less, more preferably 15000 or less, still more preferably 10000 or less.

The second modified polymer of the disclosure is also preferably one obtainable by further reacting a non-fluorine crosslinkable monomer (c). Examples of the non-fluorine crosslinkable monomer (c) include the same as those mentioned for the first modified polymer of the disclosure.

For example, the (meth)acrylate or (meth)acrylamide containing a reactive group, which serves as a non-fluorine crosslinkable monomer (c), is preferably a compound represented by the formula:

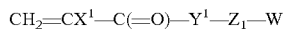

$$CH_2=CX^1—C(=O)—Y^1—Z_1—W$$

wherein
$X^1$ is a hydrogen atom, a methyl group, or a halogen atom other than a fluorine atom (e.g., a chlorine atom, a bromine atom, and an iodine atom);
$Y^1$ is —O— or —NH—;
$Z^1$ is a direct bond or a divalent organic group; and
W is a hydroxy group, an epoxy group, a chloromethyl group, a blocked isocyanate group, an amino group, a carboxyl group, a ketone group, a hydrazide group, or a melamine group.

The (meth)acrylate or (meth)acrylamide containing a hydroxy group, which serves as a non-fluorine crosslinkable monomer (c), is particularly preferably a compound represented by the formula:

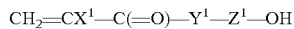

$$CH_2=CX^1—C(=O)—Y^1—Z^1—OH$$

wherein
$X^1$ is a hydrogen atom, a methyl group, or a halogen atom other than a fluorine atom (e.g., a chlorine atom, a bromine atom, and an iodine atom);
$Y^1$ is —O— or —NH—; and
$Z^1$ is a direct bond or a divalent organic group.

$Z^1$ may be, for example, a C1-C20 linear or branched aliphatic group (especially, an alkylene group), such as a group represented by the formula —$(CH_2)_x$—, wherein x is 1 to 10.

Examples of the non-fluorine crosslinkable monomer (c) include N-methylol (meth)acrylamide, N-2-propanol (meth)acrylamide, N-butylol (meth)acrylamide, hydroxyethyl (meth)acrylate, hydroxybutyl (meth)acrylate, diacetone (meth)acrylamide, 3-chloro-2-hydroxypropyl (meth)acrylate, 2-acetoacetoxyethyl (meth)acrylate, and glycidyl (meth)acrylate.

As described above, reacting the fluorine-containing polymer and the monomer in an organic solvent in the presence of a radical polymerization initiator can provide a modified polymer including a main chain containing the fluorine-containing polymer and a side chain based on the monomer.

The above reaction can provide a side chain with one or two or more of the above monomers bonded thereto. Two or more of the above monomers may be bonded. The number of monomers bonded is preferably 3 or less, more preferably 2 or less.

In particular, the reaction temperature is preferably 60° C. or higher, more preferably 70° C. or higher, still more preferably 80° C. or higher, while preferably 150° C. or lower, more preferably 140° C. or lower, still more preferably 135° C. or lower.

In the reaction, the monomer (b) is preferably in an amount of 1 to 30 parts by mass, more preferably 1 to 20 parts by mass, still more preferably 2 to 10 parts by mass, relative to 100 parts by mass of the fluorine-containing polymer (a).

In the reaction, the monomer (c) is preferably in an amount of 1 to 30 parts by mass, more preferably 1 to 20 parts by mass, still more preferably 2 to 10 parts by mass, relative to 100 parts by mass of the fluorine-containing polymer (a).

In the reaction, the fluorine-containing polymer may be reacted simultaneously with the monomer (b) and the monomer (c), or the fluorine-containing polymer may be first reacted with the monomer (b), then with the monomer (c). Preferably, the fluorine-containing polymer is reacted simultaneously with the monomer (b) and the monomer (c).

Examples of the organic solvent include esters such as methyl acetate, ethyl acetate, propyl acetate, n-butyl acetate, and tert-butyl acetate; ketones such as acetone, methyl ethyl ketone, and cyclohexanone; aliphatic hydrocarbons such as hexane, cyclohexane, octane, nonane, decane, undecane, dodecane, and mineral spirits; aromatic hydrocarbons such as benzene, toluene, xylene, naphthalene, and solvent naphtha; alcohols such as methanol, ethanol, tert-butanol, isopropanol, and ethylene glycol monoalkyl ether; cyclic ethers such as tetrahydrofuran, tetrahydropyran, and dioxane; dimethyl sulfoxide; and mixtures of any of these.

Examples of the radical polymerization initiator include persulfates such as ammonium persulfate and potassium persulfate (if necessary, a reducing agent such as sodium hydrogen sulfite, sodium pyrosulfite, cobalt naphthenate, or dimethylaniline may be used together); redox initiators each composed of an oxidizing agent (e.g., ammonium peroxide, potassium peroxide), a reducing agent (e.g., sodium sulfite) and a transition metal salt (e.g., iron sulfate); diacyl peroxides such as acetyl peroxide and benzoyl peroxide (BPO); dialkoxycarbonyl peroxides such as isopropoxycarbonyl peroxide and tert-butoxycarbonyl peroxide; ketone peroxides such as methyl ethyl ketone peroxide and cyclohexanone peroxide; hydroperoxides such as hydrogen peroxide, tert-butyl hydroperoxide, and cumene hydroperoxide; dialkyl peroxides such as di-tert-butyl peroxide and dicumyl peroxide; alkyl peroxy esters such as tert-butyl peroxyacetate and tert-butyl peroxypivalate; and azo compounds such as 2,2'-azobisisobutyronitrile, 2,2'-azobis(2,4-dimethylvaleronitrile), 2,2'-azobis(2-methylvaleronitrile), 2,2'-azobis(2-cyclopropylpropionitrile), dimethyl 2,2'-azobisisobutyrate, 2,2'-azobis[2-(hydroxymethyl)propionitrile], and 4,4'-azobis (4-cyanopentenoic acid).

The radical polymerization initiator is preferably used in an amount of 0.01 to 0.5 parts by mass, more preferably 0.05 parts by mass or more, still more preferably 0.1 parts by mass or more, while more preferably 0.3 parts by mass or less, still more preferably 0.2 parts by mass or less, relative to the total amount of the monomers.

The reaction is preferably performed further in the presence of a chain transfer agent. Examples of the chain transfer agent include mercaptan group-containing compounds (especially, (e.g., C1-C30) alkyl mercaptans) such as dodecyl mercaptan, lauryl mercaptan, thioglycol, and thioglycerol, and inorganic salts such as sodium hypophosphite and sodium hydrogen sulfite. The chain transfer agent may be used in an amount of 0.1 to 50 parts by mass, for example within a range of 2 to 20 parts by mass, relative to the total amount of the monomers which is taken as 100 parts by mass.

The reaction is preferably performed by stirring a mixture containing a fluorine-containing polymer, a monomer (b1) and/or a monomer (b2), an organic solvent, and a radical polymerization initiator.

A specific method for providing the second modified polymer of the disclosure may be, for example, a method including putting a fluorine-containing polymer and an organic solvent into a reaction container, heating the contents up to 80° C. to 90° C., optionally with stirring, adding a monomer (b1) and/or a monomer (b2), adding a chain transfer agent and a radical polymerization initiator, and then stirring the components.

The presence of a main chain of the fluorine-containing polymer and a side chain having a specific structure allows the modified polymer of the disclosure to have properties of the fluorine-containing polymer such as weather resistance, as well as excellent antifouling properties.

The disclosure also provides a composition containing the modified polymer of the disclosure.

The composition of the disclosure preferably further contains a solvent. The solvent is preferably water or an organic solvent. Examples of the organic solvent include esters such as ethyl acetate, n-butyl acetate, tert-butyl acetate, isopropyl acetate, isobutyl acetate, cellosolve acetate, and propylene glycol methyl ether acetate; ketones such as acetone, methyl ethyl ketone, methyl isobutyl ketone, and cyclohexanone; cyclic ethers such as tetrahydrofuran and dioxane; amides such as N,N-dimethylformamide and N,N-dimethylacetamide; aromatic hydrocarbons such as toluene and xylene; alcohols such as propylene glycol methyl ether; hydrocarbons such as hexane and heptane; and solvent mixtures of any of these. Examples also include third-class organic solvents of Industrial Safety and Health Act and solvents corresponding thereto, which are called weak solvents. In the case of preparing a solution in an organic solvent, the modified polymer of the disclosure has a concentration of 5 to 95% by mass, preferably 10 to 80% by mass.

The composition of the disclosure can be suitably used as a coating material when containing a solvent as described above.

The composition preferably further contains a curing agent. When the composition contains the curable functional group-containing fluorine-containing polymer as the fluorine-containing polymer, the composition particularly preferably contains a curing agent.

The curing agent is a compound that reacts with a curable functional group of the curable functional group-containing fluorine-containing polymer to crosslink. Examples thereof commonly used include isocyanates, amino resins, acid anhydrides, polyepoxy compounds, and isocyanate group-containing silane compounds. Preferred among these are isocyanates.

Specific examples of the isocyanates include, but are not limited to, 2,4-tolylene diisocyanate, diphenylmethane-4,4'-diisocyanate, xylylene diisocyanate, isophorone diisocyanate, lysine methyl ester diisocyanate, methyl cyclohexyl diisocyanate, trimethyl hexamethylene diisocyanate, hexamethylene diisocyanate, n-pentane-1,4-diisocyanate, trimers thereof, adducts, biurets, and isocyanurates thereof, polymers thereof having two or more isocyanate groups, and blocked isocyanates. Preferred among these are isocyanurates.

Specific examples of the amino resins include, but are not limited to, urea resin, melamine resin, benzoguanamine resin, and glycoluril resin, as well as methylolated melamine resin prepared by methylolating melamine and alkyl-etherified melamine resin prepared by etherifying methylolated melamine with an alcohol such as methanol, ethanol, or butanol.

Specific examples of the acid anhydrides include, but are not limited to, phthalic anhydride, pyromellitic anhydride, and mellitic anhydride.

Examples of the polyepoxy compounds and the isocyanate group-containing silane compounds used include those described in JP H02-232250 and JP H02-232251. Preferred examples thereof include the following.

[Chem. 1]

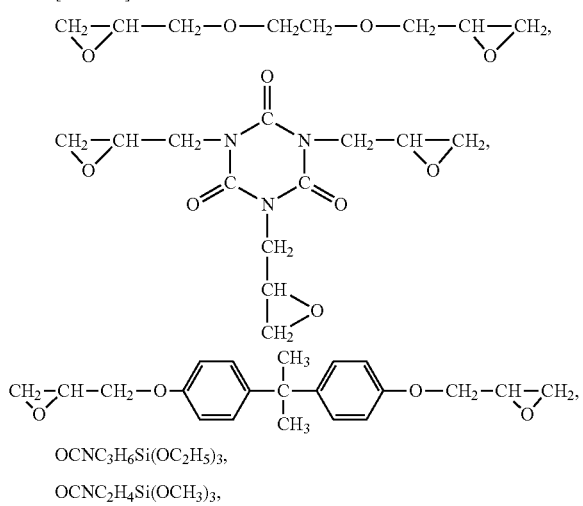

OCNC$_3$H$_6$Si(OC$_2$H$_5$)$_3$,

OCNC$_2$H$_4$Si(OCH$_3$)$_3$,

The polyisocyanate compound preferably includes at least one compound selected from the group consisting of: a polyisocyanate compound derived from at least one isocyanate selected from the group consisting of xylylene diisocyanate (XDI) and bis(isocyanatomethyl)cyclohexane (hydrogenated XDI, H6XDI); a blocked isocyanate compound based on hexamethylene diisocyanate (HDI); a polyisocyanate compound derived from hexamethylene diisocyanate (HDI); a polyisocyanate compound derived from isophorone diisocyanate (IPDI), and a water-dispersible polyisocyanate compound.

Better adhesion can be achieved when the polyisocyanate compound used is a polyisocyanate compound (hereinafter, also referred to as a polyisocyanate compound (I)) derived from at least one isocyanate (hereinafter, also referred to as an isocyanate (i)) selected from the group consisting of xylylene diisocyanate (XDI) and bis(isocyanatomethyl)cyclohexane (hydrogenated XDI, H6XDI).

Examples of the polyisocyanate compound (I) include an adduct obtainable by addition-polymerizing the isocyanate (i) and an aliphatic polyhydric alcohol having three or more hydroxy groups, an isocyanurate structure (nurate structure) formed from the isocyanate (i), and a biuret formed from the isocyanate (i).

A preferred example of the adduct is one having a structure represented by the following formula (1):

[Chem. 2]

$$R^1-(-OCONH-CH_2-R^2-CH_2-NCO)_k \qquad (1)$$

wherein $R^1$ is a C3-C20 aliphatic hydrocarbon group; $R^2$ is a phenylene group or a cyclohexylene group; and k is an integer of 3 to 20.

In the formula (1), $R^1$ is a hydrocarbon group based on the aliphatic polyhydric alcohol having three or more hydroxy groups, more preferably a C3-C10 aliphatic hydrocarbon group, still more preferably a C3-C6 aliphatic hydrocarbon group.

When $R^2$ is a phenylene group, it may be any of a 1,2-phenylene group (o-phenylene group), a 1,3-phenylene group (m-phenylene group), and a 1,4-phenylene group (p-phenylene group). Preferred among these is a 1,3-phenylene group (m-phenylene group). All $R^2$s in the formula (1) may be the same phenylene groups, or may include two or more different types of phenylene groups.

When $R^2$ is a cyclohexylene group, it may be any of a 1,2-cyclohexylene group, a 1,3-cyclohexylene group, and a 1,4-cyclohexylene group. Preferred among these is a 1,3-cyclohexylene group. All $R^2$s in the formula (1) may be the same cyclohexylene groups, or may include two or more different types of cyclohexylene groups.

The symbol k is the number corresponding to the number of hydroxy groups of the aliphatic polyhydric alcohol having three or more hydroxy groups. The symbol k is more preferably an integer of 3 to 10, still more preferably an integer of 3 to 6.

The isocyanurate structure has one or two or more isocyanurate rings each represented by the following formula (2):

[Chem. 3]

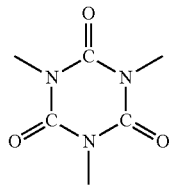

(2)

in the molecule.

Examples of the isocyanurate structure include a trimer, pentamer, and heptamer respectively obtainable by trimerization, pentamerization, and heptamerization of the isocyanate.

Preferred among these is a trimer represented by the following formula (3):

[Chem. 4]

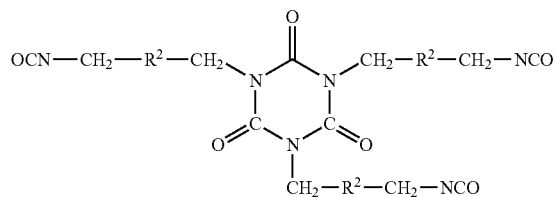

(3)

(wherein $R^2$ is defined in the same manner as $R^2$ in the formula (1)). In other words, the isocyanurate structure is preferably a trimer of at least one isocyanate selected from the group consisting of xylylene diisocyanate and bis(isocyanatomethyl)cyclohexane.

The biuret is a compound having a structure represented by the following formula (4):

[Chem. 5]

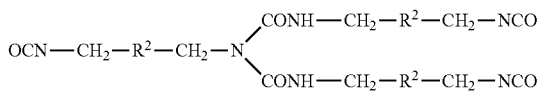

(4)

(wherein $R^2$ is defined in the same manner as $R^2$ in the formula (1)). This is obtainable by trimerizing the isocyanate under conditions different from those for the isocyanurate structure.

In particular, the polyisocyanate compound (I) is preferably the adduct, i.e., one obtainable by addition-polymerizing at least one isocyanate selected from the group consisting of xylylene diisocyanate and bis(isocyanatomethyl)cyclohexane and an aliphatic polyhydric alcohol having three or more hydroxy groups.

When the polyisocyanate compound (I) is an adduct between the isocyanate (i) and an aliphatic polyhydric alcohol having three or more hydroxy groups, specific examples of the aliphatic polyhydric alcohol having three or more hydroxy groups include trihydric alcohols such as glycerol, trimethylolpropane (TMP), 1,2,6-hexanetriol, trimethylolethane, 2,4-dihydroxy-3-hydroxymethylpentane, 1,1,1-tris(bishydroxymethyl)propane, and 2,2-bis(hydroxymethyl)butanol-3; tetrahydric alcohols such as pentaerythritol and diglycerol; pentahydric alcohols (pentites) such as arabite, ribitol, and xylitol; and hexahydric alcohols (hexites) such as sorbit, mannit, galactitol, and allodulcite. Particularly preferred among these are trimethylolpropane and pentaerythritol.

Examples of the xylylene diisocyanate (XDI) used as a constituent of the adduct include 1,3-xylylene diisocyanate (m-xylylene diisocyanate), 1,2-xylylene diisocyanate (o-xylylene diisocyanate), and 1,4-xylylene diisocyanate (p-xylylene diisocyanate). Preferred among these is 1,3-xylylene diisocyanate (m-xylylene diisocyanate).

Examples of the bis(isocyanatomethyl)cyclohexane (hydrogenated XDI, H6XDI) used as a constituent of the adduct include 1,3-bis(isocyanatomethyl)cyclohexane, 1,2-bis(isocyanatomethyl)cyclohexane, and 1,4-bis(isocyanatomethyl)cyclohexane. Preferred among these is 1,3-bis(isocyanatomethyl)cyclohexane.

An adduct is obtainable by addition-polymerizing at least one isocyanate selected from the group consisting of xylylene diisocyanate and bis(isocyanatomethyl)cyclohexane and the aforementioned aliphatic polyhydric alcohol having three or more hydroxy groups.

A specific example of the adduct is a compound represented by the following formula (5):

[Chem. 6]

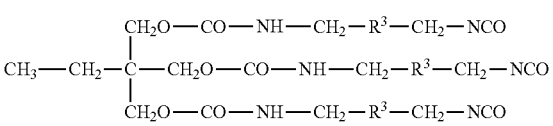

(5)

(wherein $R^3$ is a phenylene group or a cyclohexylene group), i.e., a polyisocyanate compound obtainable by addition-polymerizing at least one isocyanate selected from the group consisting of xylylene diisocyanate and bis(isocyanatomethyl)cyclohexane and trimethylolpropane (TMP).

The phenylene group or cyclohexylene group represented by $R^3$ in the formula (5) is as described for $R^2$ in the formula (1).

Examples of commercially available products of the polyisocyanate compound represented by the formula (5) include Takenate D110N (available from Mitsui Chemicals, Inc., adduct between XDI and TMP, NCO content 11.8%) and Takenate D120N (available from Mitsui Chemicals, Inc., adduct between H6XDI and TMP, NCO content 11.0%). When the polyisocyanate compound (I) is an isocyanurate structure, specific examples include Takenate D121N (available from Mitsui Chemicals, Inc., H6XDI nurate, NCO content 14.0%) and Takenate D127N (available from Mitsui Chemicals, Inc., H6XDI nurate, trimer of H6XDI, NCO content 13.5%).

The composition is allowed to have sufficient pot life (working life) when the polyisocyanate compound used is a blocked isocyanate based on hexamethylene diisocyanate (HDI) (hereinafter, also referred to simply as a blocked isocyanate).

The blocked isocyanate is preferably one obtainable by reacting a polyisocyanate compound derived from hexamethylene diisocyanate (hereinafter, also referred to as a polyisocyanate compound (II)) with a blocking agent.

Examples of the polyisocyanate compound (II) include an adduct obtainable by addition-polymerizing hexamethylene diisocyanate and an aliphatic polyhydric alcohol having three or more hydroxy groups, an isocyanurate structure (nurate structure) formed from hexamethylene diisocyanate, and a biuret formed from hexamethylene diisocyanate.

A preferred example of the adduct is one having a structure represented by the following formula (6):
[Chem. 7]

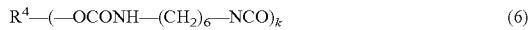

$$R^4—(—OCONH—(CH_2)_6—NCO)_k \qquad (6)$$

wherein $R^4$ is a C3-C20 aliphatic hydrocarbon group; and k is an integer of 3 to 20.

In the formula (6), $R^4$ is a hydrocarbon group based on the aliphatic polyhydric alcohol having three or more hydroxy groups, more preferably a C3-C10 aliphatic hydrocarbon group, still more preferably a C3-C6 aliphatic hydrocarbon group.

The symbol k is the number corresponding to the number of hydroxy groups of the aliphatic polyhydric alcohol having three or more hydroxy groups. The symbol k is more preferably an integer of 3 to 10, still more preferably an integer of 3 to 6.

The isocyanurate structure has one or two or more isocyanurate rings each represented by the following formula (2):

[Chem. 8]

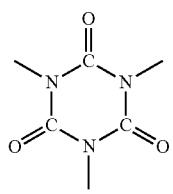

(2)

in the molecule.

Examples of the isocyanurate structure include a trimer, pentamer, and heptamer respectively obtainable by trimerization, pentamerization, and heptamerization of the isocyanate.

In particular, a trimer represented by the following formula (7):

[Chem. 9]

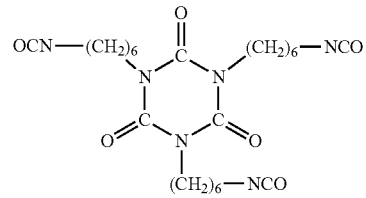

(7)

is preferred.

The biuret is a compound having a structure represented by the following formula (8).

[Chem. 10]

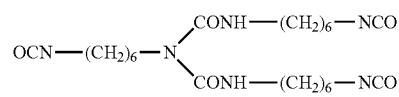

(8)

This is obtainable by trimerizing hexamethylene diisocyanate under conditions different from those for the isocyanurate structure.

The blocking agent used is preferably a compound containing active hydrogen. For example, the compound containing active hydrogen used preferably includes at least one selected from the group consisting of an alcohol, an oxime, a lactam, an active methylene compound, and a pyrazole compound.

As described above, preferably, the blocked isocyanate is one obtainable by reacting a polyisocyanate compound derived from hexamethylene diisocyanate with a blocking agent and the blocking agent includes at least one selected from the group consisting of an alcohol, an oxime, a lactam, an active methylene compound, and a pyrazole compound.

When the polyisocyanate compound (II) for producing a blocked isocyanate is an adduct between hexamethylene diisocyanate and an aliphatic polyhydric alcohol having three or more hydroxy groups, specific examples of the aliphatic polyhydric alcohol having three or more hydroxy groups include trihydric alcohols such as glycerol, trimethylolpropane (TMP), 1,2,6-hexanetriol, trimethylolethane, 2,4-dihydroxy-3-hydroxymethylpentane, 1,1,1-tris(bishydroxymethyl)propane, and 2,2-bis(hydroxymethyl)butanol-3; tetrahydric alcohols such as pentaerythritol and diglycerol; pentahydric alcohols (pentites) such as arabite, ribitol, and xylitol; and hexahydric alcohols (hexites) such as sorbit, mannit, galactitol, and allodulcite. Particularly preferred among these are trimethylolpropane and pentaerythritol.

The adduct is obtainable by addition-polymerizing hexamethylene diisocyanate and the aforementioned aliphatic polyhydric alcohol having three or more hydroxy groups.

Specific examples of the compound containing active hydrogen to be reacted with the polyisocyanate compound (II) include alcohols such as methanol, ethanol, n-propanol, isopropanol, and methoxypropanol; oximes such as acetone oxime, 2-butanone oxime, and cyclohexanone oxime; lactams such as ε-caprolactam; active methylene compounds such as methyl acetoacetate and ethyl malonate; and pyrazole compounds such as 3-methylpyrazole, 3,5-dimethylpyrazole, and 3,5-diethylpyrazole. One or two or more of these may be used.

Preferred among these are active methylene compounds and oximes, more preferred are active methylene compounds.

Examples of commercially available products of the blocked isocyanate include Duranate K6000 (available from Asahi Kasei Chemicals Corp., blocked isocyanate of HDI with active methylene compound), Duranate TPA-B80E (available from Asahi Kasei Chemicals Corp.), Duranate MF-B60X (available from Asahi Kasei Chemicals Corp.), Duranate 17B-60PX (available from Asahi Kasei Chemicals Corp.), Coronate 2507 (available from Nippon Polyurethane Industry Co., Ltd.), Coronate 2513 (available from Nippon Polyurethane Industry Co., Ltd.), Coronate 2515 (available from Nippon Polyurethane Industry Co., Ltd.), Sumidur BL-3175 (available from Sumika Bayer Urethane Co., Ltd.), Luxate HC1170 (Olin Chemicals Corp.), and Luxate HC2170 (Olin Chemicals Corp.).

The polyisocyanate compound used may be a polyisocyanate compound derived from hexamethylene diisocyanate (HDI) (hereinafter, also referred to as a polyisocyanate compound (III)). Examples of the polyisocyanate compound (III) include those described for the polyisocyanate compound (II).

Specific examples of the polyisocyanate compound (III) include Coronate HX (available from Nippon Polyurethane Industry Co., Ltd., isocyanurate structure of hexamethylene diisocyanate, NCO content 21.1%), Sumidur N3300 (available from Sumika Bayer Urethane Co., Ltd., isocyanurate structure of hexamethylene diisocyanate), Takenate D170N (available from Mitsui Chemicals, Inc., isocyanurate structure of hexamethylene diisocyanate), Sumidur N3800 (available from Sumika Bayer Urethane Co., Ltd., isocyanurate structure prepolymer type of hexamethylene diisocyanate), Desmodur N3390 (available from Sumika Bayer Urethane Co., Ltd., NCO content 19.6%), D-370N (available from Mitsui Chemicals, Inc., NCO content 25.0%), AE-700 (available from Asahi Kasei Corp., NCO content 11.9%), and D-201 (available from Mitsui Chemicals, Inc., NCO content 15.8%).

The polyisocyanate compound used may also be a polyisocyanate compound derived from isophorone diisocyanate (IPDI) (hereinafter, also referred to as a polyisocyanate compound (IV)).

Examples of the polyisocyanate compound (IV) include an adduct obtainable by addition-polymerizing isophorone diisocyanate and an aliphatic polyhydric alcohol having three or more hydroxy groups, an isocyanurate structure (nurate structure) formed from isophorone diisocyanate, and a biuret formed from isophorone diisocyanate.

A preferred example of the adduct is one having a structure represented by the following formula (9):

[Chem. 11]

wherein $R^5$ is a C3-C20 aliphatic hydrocarbon group; $R^6$ is a group represented by the following formula (10):

[Chem. 12]

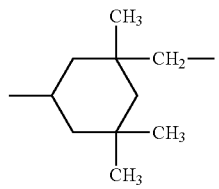

and k is an integer of 3 to 20.

In the formula (9), $R^5$ is a hydrocarbon group based on the aliphatic polyhydric alcohol having three or more hydroxy groups, more preferably a C3-C10 aliphatic hydrocarbon group, still more preferably a C3-C6 aliphatic hydrocarbon group.

The symbol k is the number corresponding to the number of hydroxy groups of the aliphatic polyhydric alcohol having three or more hydroxy groups. The symbol k is more preferably an integer of 3 to 10, still more preferably an integer of 3 to 6.

The isocyanurate structure has one or two or more isocyanurate rings each represented by the following formula (2):

[Chem. 13]

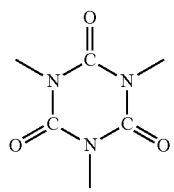

in the molecule.

Examples of the isocyanurate structure include a trimer, pentamer, and heptamer respectively obtainable by trimerization, pentamerization, and heptamerization of the isophorone diisocyanate.

Preferred among these is a trimer represented by the following formula (11):

[Chem. 14]

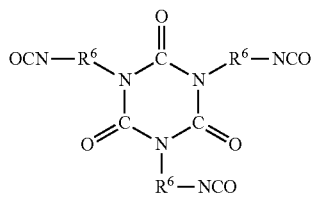

(wherein $R^6$ is defined in the same manner as $R^6$ in the formula (9)). In other words, the isocyanurate structure is preferably a trimer of isophorone diisocyanate.

The biuret is a compound having a structure represented by the following formula (12):

[Chem. 15]

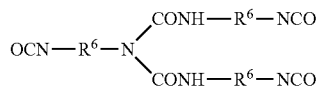
(12)

(wherein $R^6$ is defined in the same manner as $R^6$ in the formula (9)). This is obtainable by trimerizing isophorone diisocyanate under conditions different from those for the isocyanurate structure.

In particular, the polyisocyanate compound (IV) preferably includes at least one selected from the group consisting of the adduct and the isocyanurate structure. In other words, the polyisocyanate compound (IV) preferably includes at least one selected from the group consisting of an adduct obtainable by addition-polymerizing isophorone diisocyanate and an aliphatic polyhydric alcohol having three or more hydroxy groups and an isocyanurate structure formed from isophorone diisocyanate.

When the polyisocyanate compound (IV) is an adduct between isophorone diisocyanate and an aliphatic polyhydric alcohol having three or more hydroxy groups, specific examples of the aliphatic polyhydric alcohol having three or more hydroxy groups include trihydric alcohols such as glycerol, trimethylolpropane (TMP), 1,2,6-hexanetriol, trimethylolethane, 2,4-dihydroxy-3-hydroxymethylpentane, 1,1,1-tris(bishydroxymethyl)propane, and 2,2-bis(hydroxymethyl)butanol-3; tetrahydric alcohols such as pentaerythritol and diglycerol; pentahydric alcohols (pentites) such as arabite, ribitol, and xylitol; and hexahydric alcohols (hexites) such as sorbit, mannit, galactitol, and allodulcite. Particularly preferred among these are trimethylolpropane and pentaerythritol.

An adduct suitably used in the present invention is obtainable by addition-polymerizing isophorone diisocyanate and the aforementioned aliphatic polyhydric alcohol having three or more hydroxy groups.

A specific example of an adduct preferably used in the present invention is a compound represented by the following formula (13):

[Chem. 16]

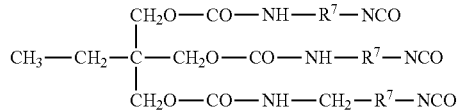
(13)

(wherein $R^7$ is a group represented by the following formula (10):

[Chem. 17]

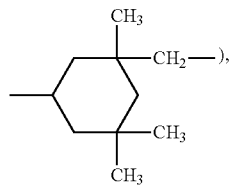
(10)

i.e., a polyisocyanate compound obtainable by addition-polymerizing isophorone diisocyanate and trimethylolpropane (TMP).

An example of commercially available products of the polyisocyanate compound represented by the formula (10) (adduct of isophorone diisocyanate with TMP) is Takenate D140N (available from Mitsui Chemicals, Inc., NCO content 11%).

An example of commercially available products of the isocyanurate structure formed from isophorone diisocyanate is Desmodur 24470 (available from Sumika Bayer Urethane Co., Ltd., NCO content 11%).

The polyisocyanate compound used may also be a water-dispersible polyisocyanate compound. The water-dispersible polyisocyanate compound refers to a polyisocyanate compound that may form water-dispersed matter when added to and stirred in an aqueous medium. Examples of this water-dispersible polyisocyanate compound include (1) a mixture of a hydrophobic polyisocyanate and a polyisocyanate having a hydrophilic group, (2) a mixture of a hydrophobic polyisocyanate and a dispersant having no isocyanate group and having a hydrophilic group, and (3) a polyisocyanate having a hydrophilic group alone. In the present invention, the hydrophilic group refers to an anionic group, a cationic group, or a nonionic group. The water-dispersible polyisocyanate compound is particularly preferably a polyisocyanate having a hydrophilic group.

The hydrophobic polyisocyanate refers to one having no hydrophilic group. Examples thereof include aliphatic diisocyanates such as 1,4-tetramethylene diisocyanate, ethyl(2,6-diisocyanato)hexanoate, 1,6-hexamethylene diisocyanate, 1,12-dodecamethylene diisocyanate, and 2,2,4- or 2,4,4-trimethylhexamethylene diisocyanate; aliphatic triisocyanates such as 1,3,6-hexamethylene triisocyanate, 1,8-diisocyanato-4-isocyanatomethyl octane, and 2-isocyanatoethyl (2,6-diisocyanato)hexanoate; alicyclic diisocyanates such as 1,3-bis(isocyanatomethyl cyclohexane), 1,4-bis(isocyanatomethyl cyclohexane), 1,3-diisocyanatocyclohexane, 1,4-diisocyanatocyclohexane, 3,5,5-trimethyl(3-isocyanatomethyl)cyclohexyl isocyanate, dicyclohexylmethane-4,4'-diisocyanate, 2,5-diisocyanatomethylnorbornane, and 2,6-diisocyanatomethylnorbornane; alicyclic triisocyanates such as 2,5-diisocyanatomethyl-2-isocyanatopropylnorbornane and 2,6-diisocyanatomethyl-2-isocyanatopropylnorbornane; aralkylene diisocyanates such as m-xylylene diisocyanate and α,α,α'α'-tetramethyl-m-xylylene diisocyanate; aromatic diisocyanates such as m- or p-phenylene diisocyanate, tolylene-2,4-diisocyanate, tolylene-2,6-diisocyanate, diphenylmethane-4,4'-diisocyanate, naphthalene-1,5-diisocyanate, diphenyl-4,4'-diisocyanate, 4,4'-diisocyanato-3,3'-dimethyldiphenyl, 3-methyl-diphenylmethane-4,4'-diisocyanate, and diphenylether-4,4'-diisocyanate; aromatic triisocyanates such as triphenylmethane triisocyanate and tris(isocyanatophenyl)thiophosphate; polyisocyanates having a uretdione structure obtainable by cyclodimerizing the isocyanate groups of the diisocyanate or triisocyanate; polyisocyanates having an isocyanurate structure obtainable by cyclotrimerizing the isocyanate groups of the diisocyanate or triisocyanate; polyisocyanates having a biuret structure obtainable by reacting the diisocyanate or triisocyanate with water; polyisocyanates having an oxadiazine-trione structure obtainable by reacting the diisocyanate or triisocyanate with carbon dioxide; and polyisocyanates having an allophanate structure. In order to form a densely crosslinked coating film and allow a cured coating film to have more improved alcohol resistance, preferred among these are polyisocyanates having an isocyanurate structure.

Examples of the polyisocyanate having a hydrophilic group include a polyether, a polyester, a polyurethane, a vinyl polymer, an alkyd resin, a fluororesin, and a silicone resin each having a hydrophilic group and an isocyanate group. In terms of good water-dispersibility, preferred among these is a polyether or vinyl polymer having a hydrophilic group and an isocyanate group, more preferred is a polyether having a hydrophilic group and an isocyanate group. These polyisocyanates having a hydrophilic group may be used alone or in combination of two or more thereof.

Examples of commercially available products of the water-dispersible polyisocyanate compound include Bayhydur XP2700 (available from Sumika Bayer Urethane Co., Ltd.) and Bayhydur 3100 (available from Sumika Bayer Urethane Co., Ltd.).

More preferred polyisocyanate compounds among these are Desmodur N3390 (available from Sumika Bayer Urethane Co., Ltd., NCO content 19.6%), Takenate D120N (available from Mitsui Chemicals, Inc., NCO content 11%), and Sumidur N3300 (available from Sumika Bayer Urethane Co., Ltd., isocyanurate structure of hexamethylene diisocyanate).

Preferably, the composition of the disclosure further contains a polyisocyanate compound and has an equivalent ratio of the isocyanate group (NCO) of the polyisocyanate compound to the hydroxy group (OH) of the modified polymer (NCO/OH) of lower than 1.0.

In order to achieve much better adhesion and abrasion resistance, the equivalent ratio is preferably 0.90 or lower, more preferably 0.85 or lower, while preferably 0.20 or higher, more preferably 0.30 or higher.

The composition also preferably further contains a resin other than the modified polymer. Examples of this additional resin include polystyrene, (meth)acrylic resin, polyester resin, alkyd resin, melamine-formaldehyde resin, polyisocyanate resin, epoxy resin, vinyl chloride resin (e.g., vinyl chloride-vinyl acetate copolymer), ketone resin, and petroleum resin, as well as organic resins, including chlorinated products of polyolefins such as polyethylene and polypropylene; inorganic resins such as silica gel and silicic acid; and a variety of fluororesins other than the modified polymer (e.g., homopolymers of tetrafluoroethylene and chlorotrifluoroethylene, and copolymers of these and a different monomer). The proportion of the additional resin is 900 parts by mass or less, preferably 500 parts by mass or less, relative to 100 parts by mass of the modified polymer. The lower limit thereof is an amount required to achieve target properties and depends on the type of the resin. In the case of a (meth)acrylic resin, the lower limit is commonly 5 parts by mass or more, preferably 10 parts by mass or more.

The composition preferably contains a (meth)acrylic resin, which has excellent miscibility, among these resins. This allows the resulting coating film to have high gloss, high hardness, and good finishing appearance.

The (meth)acrylic resin may be a (meth)acrylic polymer conventionally used for coating material. Particularly preferably used are (i) a homopolymer or copolymer of a C1-C10 alkyl (meth)acrylate and (ii) a (meth)acrylate copolymer having a curable functional group at a side chain and/or a main chain end.

Examples of the (meth)acrylic polymer (i) include homopolymers and copolymers of a C1-C10 alkyl (meth) acrylate such as n-butyl (meth)acrylate, isobutyl (meth) acrylate, and 2-ethylhexyl (meth)acrylate, and copolymers with an ethylenically unsaturated monomer that is copolymerizable with these.

Examples of the copolymerizable ethylenically unsaturated monomer include (meth)acrylates having an aromatic group, (meth)acrylates having a fluorine atom or a chlorine atom at a position, fluoroalkyl (meth)acrylates in which an alkyl group is replaced by a fluorine atom, vinyl ethers, vinyl esters, aromatic vinyl monomers such as styrene, olefins such as ethylene, propylene, isobutylene, vinyl chloride, and vinylidene chloride, fumaric acid diesters, maleic acid diesters, and (meth)acrylonitrile.

Examples of the (meth)acrylic polymer (ii) include copolymers of a monomer having a curable functional group together with a monomer to give a (meth)acrylic polymer described in the above item (i). Examples of the curable functional group-containing monomer include monomers having any of a hydroxy group, a carboxyl group, an epoxy group, an amino group, and the like. Specific examples of the (meth)acrylic polymer (ii) include, but are not limited to, a copolymer of a monomer having a curable functional group, such as hydroxyethyl (meth)acrylate, 2-hydroxypropyl (meth)acrylate, 2-hydroxyethyl vinyl ether, (meth) acrylic acid, glycidyl (meth)acrylate, 2-aminoethyl (meth) acrylate, and 2-aminopropyl (meth)acrylate and a C1-C10 alkyl ester of the (meth)acrylic acid, and a copolymer of any of these and the copolymerizable ethylenically unsaturated monomer.

The (meth)acrylic polymer preferably has a number average molecular weight, determined by GPC, of 1000 to 200000, more preferably 2000 to 100000. A larger number average molecular weight tends to cause poor solvent solubility, while a smaller number average molecular weight tends to cause issues related to weather resistance.

The composition may further contain an additive. Examples of the additive include a curing accelerator, a pigment, a dispersant, a fluidity improver, a leveling agent, an antifoam, an anti-gelling agent, an ultraviolet absorber, an antioxidant, a hydrophilizing agent, a matting agent, an adhesion promoter, and a flame retarder.

An example of the pigment is titanium dioxide. The titanium dioxide may have either a rutile structure or an anatase structure, although not limited thereto. In terms of weather resistance, a rutile structure is preferred. The titanium dioxide may be titanium dioxide obtainable by treating the surface of titanium dioxide fine particles with inorganic matter or with organic matter, or titanium dioxide treated with both inorganic matter and organic matter. Examples of the titanium dioxide treated with inorganic matter include those obtainable by covering the surface of titanium dioxide fine particles with alumina ($Al_2O_3$), silica ($SiO_2$), or zirconia ($ZrO_2$). Examples of the titanium dioxide treated with organic matter include those having a surface treated with a silane-coupling agent, those having a surface treated with organosiloxane, those having a surface treated with organic polyol, and those having a surface treated with an alkylamine. The titanium dioxide preferably has a basic value, which is obtained by titration, higher than the acid value.

Examples of commercially available products of the titanium dioxide include D-918 (available from Sakai Chemical Industry Co., Ltd.), R-960, R-706, and R-931 (available from DuPont), and PFC-105 (available from Ishihara Sangyo Kaisha, Ltd.).

The titanium dioxide is preferably contained in an amount of 1 to 500 parts by mass relative to 100 parts by mass of the modified polymer. Less than 1 part by mass thereof may fail to block ultraviolet rays. More than 500 parts by mass thereof may cause yellowing and deterioration due to ultraviolet rays. The amount of the titanium dioxide contained is more preferably 5 parts by mass or more, still more preferably 10 parts by mass or more, while more preferably 300 parts by mass or less, still more preferably 200 parts by mass or less.

Another example of the pigment is carbon black. Examples of the carbon black include, but are not limited to, commonly known ones. In terms of an ultraviolet blocking effect, the carbon black preferably has an average particle size of 10 to 150 nm, more preferably 20 to 100 nm. The average particle size is a value obtained by electron-microscopic observation.

The carbon black may coagulate in the composition. In terms of an ultraviolet blocking effect, the average particle size in this case is preferably 50 to 1000 nm, more preferably 100 to 700 nm, still more preferably 100 to 500 nm. The average particle size is a value obtained by measurement using a laser diffraction-scattering particle size distribution analyzer.

The carbon black is preferably contained in an amount of 0.5 to 80 parts by mass relative to 100 parts by mass of the modified polymer. Carbon black contained in an amount within the above range can well disperse in the composition. The amount of the carbon black contained is more preferably 3 parts by mass or more, still more preferably 10 parts by mass or more, while more preferably 60 parts by mass or less, still more preferably 50 parts by mass or less, relative to 100 parts by mass of the modified polymer.

Examples of commercially available products of the carbon black include MA-100 (available from Mitsubishi Chemical Corp.) and Raven-420 (available from Columbian Carbon Co.).

When containing the pigment, the composition preferably further contains a dispersant or fluidity improver to be described later.

An example of the dispersant is a compound containing an acid radical (other than those containing an unsaturated group). Examples of the acid radical include a phosphate group, a carboxylate group, and a sulfonate group. In order to prevent coagulation of pigment for a longer period of time and to allow the composition to have excellent storage stability, the acid radical preferably includes at least one selected from the group consisting of a phosphate group and a carboxylate group, more preferably a phosphate group. The dispersant contains a compound having no unsaturated group. The absence of an unsaturated group can reduce deterioration of the compound due to exposure to ultraviolet rays.

The dispersant preferably has a weight average molecular weight of 300 to 1000000. A weight average molecular weight of less than 300 may cause insufficient steric stabilization of an adsorbing resin layer, possibly causing a failure in preventing coagulation of titanium dioxide. A weight average molecular weight of more than 1000000 may cause mottle or poor weather resistance. The weight average molecular weight is more preferably 1000 or more while more preferably 100000 or less. The weight average molecular weight can be measured by gel permeation chromatography (GPC) (polystyrene equivalent).

In order to achieve effective adsorption to the surface of titanium dioxide, the dispersant preferably has an acid value of 3 to 2000 mgKOH/g, more preferably 5 mgKOH/g or higher, still more preferably 10 mgKOH/g or higher, while more preferably 1000 mgKOH/g or lower, still more preferably 500 mgKOH/g or lower. The acid value can be measured by acid-base titration using a basic substance.

The dispersant may further contain a base. An example of the base is an amino group.

In order to achieve good long-term storage stability of the dispersant, the dispersant preferably has a basic value of 15 mgKOH/g or lower, more preferably 5 mgKOH/g or lower. When the acid value of the dispersant is 15 mgKOH/g or lower, the basic value is still more preferably lower than 5 mgKOH/g.

The dispersant is still more preferably substantially free from a base. The phrase "substantially free from a base" means that the measured basic value is 0.5 mgKOH/g or lower in consideration of contamination, reaction residues, and measurement errors. The basic value can be measured by acid-base titration using an acidic substance.

The dispersant used may be a commercially available product. Examples thereof include Disparlon 2150, Disparlon DA-325, DA-375, and DA-1200 (trade name, available from Kusumoto Chemicals, Ltd.), FLOWLEN G-700 and G-900 (trade name, available from Kyoeisha Chemical Co., Ltd.), SOLSPERSE 26000, 32000, 36000, 36600, 41000, and 55000 (trade name, available from Lubrizol Japan Ltd.), and DISPERBYK-102, 106, 110, 111, 140, 142, 145, 170, 171, 174, and 180 (trade name, available from BYK-Chemie Japan KK). In order to achieve good long-term storage stability, preferred among these are Disparlon DA-375, FLOWLEN G-700, and SOLSPERSE 36000, more preferred is Disparlon DA-375.

The dispersant is preferably used together with the titanium dioxide. The dispersant is preferably contained in an amount of 0.1 to 100 parts by mass relative to 100 parts by mass of the titanium dioxide. Less than 0.1 parts by mass thereof may fail to provide an effect of preventing precipitation of the pigment. More than 100 parts by mass thereof may cause mottle or poor weather resistance. The amount of the dispersant is more preferably 0.5 parts by mass or more, still more preferably 1.5 parts by mass or more, while more preferably 50 parts by mass or less, still more preferably 20 parts by mass or less.

An example of the fluidity improver is an associative acrylic polymer containing an acid radical and a base. The associative acrylic polymer has an effect that polar groups contained in its acrylic polymer chain form a structure by partial adsorption owing to hydrogen bonding or electric interaction inside a polymer chain or between polymer chains and thereby increase the viscosity of the liquid.

Examples of the acrylic polymer include copolymers containing, as a main monomer component, a (meth)acrylate such as methyl (meth)acrylate, ethyl (meth)acrylate, n-butyl (meth)acrylate, isobutyl (meth)acrylate, t-butyl (meth)acrylate, n-octyl (meth)acrylate, isooctyl (meth)acrylate, 2-ethylhexyl (meth)acrylate, isononyl (meth)acrylate, or cyclohexyl (meth)acrylate. The "(meth)acrylate" encompasses acrylate and methacrylate.

Preferred among the acid radicals are a carboxylate group, a phosphate group, and a sulfonate group. In order to prevent coagulation of pigment for a longer period of time and to maintain the storage stability of the composition, preferred among these is a carboxylate group. An example of the base is an amino group.

The fluidity improver may also be a reaction product between a carboxylic acid and a nitrogen-containing compound of hydroxyamine or hydroxyimine. The carboxylic acid and the nitrogen-containing compound are most preferably reacted at a ratio of 1:1. Examples of the carboxylic acid include a dicarboxylic acid and an acid anhydride. Examples of the hydroxyamine include primary, secondary, and tertiary alkanolamines such as monoethanolamine, propanolamine, diethanolamine, triethanolamine, and n-butyldiethanolamine, and mixtures of any of these. Examples of the hydroxyimine include those having an oxazoline structure, specifically Alkaterge T (trade name, available from Angus Chemical), for example.

The fluidity improver preferably has a weight average molecular weight of 1000 to 1000000. A weight average molecular weight of less than 1000 may cause insufficient formation of structure by association and may cause a failure in preventing precipitation of titanium dioxide. A weight average molecular weight of more than 1000000 may cause an excessive increase in viscosity of the liquid, possibly resulting in poor paintability. The weight average molecular weight is more preferably 5000 or more, while more preferably 100000 or less. The weight average molecular weight can be measured by gel permeation chromatography (GPC) (polystyrene equivalent).

The fluidity improver used may be a commercially available product. An example thereof is SOLTHIX 250 (trade name, available from Lubrizol Japan Ltd.).

The fluidity improver is preferably in an amount of 0.05 to 20% by mass in the composition. Less than 0.05% by mass thereof may fail to prevent precipitation of titanium dioxide. More than 20% by mass may cause separation or mottle. The amount of the fluidity improver is more preferably 0.1% by mass or more, still more preferably 0.3% by mass or more, while more preferably 10% by mass or less, still more preferably 5% by mass or less.

The flame retarder is preferably one that generates nonflammable gas in an early stage of combustion to dilute flammable gas and/or to block oxygen, thereby achieving incombustibility.

The flame retarder preferably includes at least one selected from the group consisting of a compound containing a Group 5B element in the Periodic Table and a compound containing a Group 7B halogen compound in the Periodic Table.

Examples of the compound containing a Group 7B halogen compound in the Periodic Table include aliphatic, alicyclic, or aromatic organohalogen compounds, including bromine-based compounds such as tetrabromobisphenol A (TBA), decabromodiphenyl ether (DBDPE), octabromodiphenyl ether (OBDPE), a TBA epoxy/phenoxy oligomer, and brominated crosslinked polystyrene, and chlorine-based compounds such as chlorinated paraffin and perchlorocyclopentadecane.

Examples of the compound containing a Group 5B element in the Periodic Table include phosphorus compounds such as a phosphoric acid ester and a polyphosphoric acid salt. Also preferred is use of a halogen compound with an antimony compound, such as antimony trioxide or antimony pentaoxide. Also usable are aluminum hydroxide, magnesium hydroxide, and molybdenum trioxide.

At least one of these flame retarders may be selected and the amount thereof may be selected in accordance with the type of the modified polymer with no limitation.

A more preferred specific example of the flame retarder is a phosphorus- and nitrogen-containing composition (A) or a mixture (B) of a bromine-containing compound and an antimony-containing compound. Combining any of these flame retarders with the modified polymer can lead to high incombustibility.

The phosphorus- and nitrogen-containing composition (A) is preferably a mixture of piperazine pyrophosphate and a melamine cyanurate. Examples of piperazine pyrophosphate include those disclosed in JP S48-088791 A and in U.S. Pat. No. 4,599,375 B. An example of melamine cyanurate is powder of a reaction product of melamine and cyanuric acid. The reaction product of melamine and cyanuric acid contains a large amount of nitrogen atoms in the structure and has a function of generating nitrogen gas when exposed to a high temperature of about 350° C. or higher to inhibit combustion.

The phosphorus- and nitrogen-containing composition (A) preferably satisfies a ratio by mass of the melamine cyanurate to the piperazine pyrophosphate of 0.014 to 3.000. Melamine cyanurate within the above range can lead to improved incombustibility and good blocking performance of the coating film. The ratio by mass of the melamine cyanurate to the piperazine pyrophosphate is more preferably 0.04 or higher, still more preferably 0.1 or higher, while more preferably 1.4 or lower, still more preferably 0.5 or lower, in the mixture.

Examples of commercially available products of the phosphorus- and nitrogen-containing composition (A) to be used include SCFR-200 (available from Sakai Chemical Industry Co., Ltd.) and SCFR-110 (available from Sakai Chemical Industry Co., Ltd.).

The bromine-containing compound is preferably an aromatic compound having a bromine content of 65% or higher, a melting point of 200° C. or higher, and a 5% decomposition temperature of 340° C. or higher.

Specifically, the bromine-containing compound preferably includes at least one selected from the group consisting of decabromodiphenyl oxide, 1,2-bis(2,3,4,5,6-pentabromophenyl)ethane, tris(tribromophenoxy)triazine, ethylenebistetrabromophthalimide, polybromophenylindan, bromininated phenylene oxide, and polypentabromobenzyl acrylate.

More preferred among these is 1,2-bis(2,3,4,5,6-pentabromophenyl)ethane represented by the following formula (a), because it has a high melting point and can reduce melting and bleeding out of the coating film when the coating film is heated and solidified.

[Chem. 18]

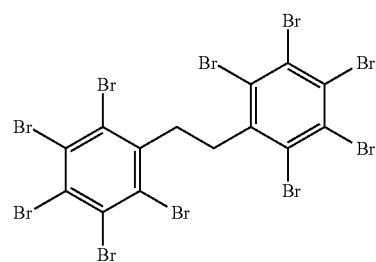

(a)

The bromine-containing compound used may be a commercially available product, such as SAYTEX8010 (available from Albemarle Corp.).

Examples of the antimony-containing compound include antimony oxides such as antimony trioxide and antimony pentaoxide. In order to obtain at low cost, preferred among these is antimony trioxide.

The flame retarder contained is preferably in an amount of 1 to 45 parts by mass relative to 100 parts by mass of the modified polymer. The flame retarder in an amount within the above range is expected to result in good dispersibility in the composition and improved incombustibility of the coating film obtained from the composition. Less than 1 part by mass of the flame retarder may fail to give improved incombustibility. More than 45 parts by mass thereof may cause a difficulty in maintaining the physical properties of the composition and the coating film. The amount of the flame retarder is more preferably 30 parts by mass or less, still more preferably 20 parts by mass or less, particularly preferably 15 parts by mass or less, while more preferably 3 parts by mass or more, still more preferably 5 parts by mass or more, relative to 100 parts by mass of the modified polymer.

When the flame retarder is the phosphorus- and nitrogen-containing composition (A), the amount thereof is preferably 8 to 19 parts by mass relative to 100 parts by mass of the modified polymer. The amount of the phosphorus- and nitrogen-containing composition (A) is more preferably 9 parts by mass or more, still more preferably 10 parts by mass or more, while more preferably 17 parts by mass or less, still more preferably 15 parts by mass or less, relative to 100 parts by mass of the modified polymer.

When the flame retarder is the mixture (B) of a bromine-containing compound and an antimony-containing compound, the amount thereof is preferably such that the amount of the bromine-containing compound is 1 to 30 parts by mass and the amount of the antimony-containing compound is 0.5 to 15 parts by mass relative to 100 parts by mass of the modified polymer. The amount of the bromine-containing compound is more preferably 3 parts by mass or more, still more preferably 5 parts by mass or more, while more preferably 20 parts by mass or less, still more preferably 15 parts by mass or less, relative to 100 parts by mass of the modified polymer. The amount of the antimony compound is more preferably 1.5 parts by mass or more, still more preferably 2.5 parts by mass or more, while more preferably 10 parts by mass or less, still more preferably 7.5 parts by mass or less, relative to 100 parts by mass of the modified polymer.

Examples of the curing accelerator include an organotin compound, an acidic phosphoric acid ester, a reaction product of an acidic phosphoric acid ester and an amine, a saturated or unsaturated polycarboxylic acid or an acid anhydride thereof, organotitanate compound, an amine compound, and lead octylate.

Specific examples of the organotin compound include dibutyltin dilaurate, dibutyltin maleate, dioctyltin maleate, dibutyltin diacetate, dibutyltin phthalate, tin octylate, tin naphthenate, and dibutyltin methoxide.

The acidic phosphoric acid ester refers to a phosphoric acid ester having the following portion.

[Chem. 19]

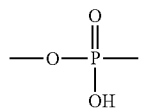

An example thereof is an organic acidic phosphoric acid ester represented by

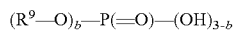

wherein b is 1 or 2; and $R^9$ is an organic residue.

Specific examples thereof include the following.

[Chem. 20]

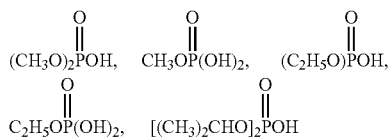

$C_2H_5OP(OH)_2$, $[(CH_3)_2CHO]_2POH$

Examples of the organotitanate compound include titanate esters such as tetrabutyl titanate, tetraisopropyl titanate, and triethanolamine titanate. Examples of commercially available products include Orgatix TC-100, TC-750, TC-760, and TA-30 available from Matsumoto Fine Chemical Co., Ltd.

Specific examples of the amine compound include amine compounds such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, and 1,8-diazabicyclo(5.4.0)undecene-7 (DBU), salts thereof with a carboxylic acid, low molecular weight polyamide resin obtainable from excessive polyamine and polybasic acid, and a reaction product of excessive polyamine and an epoxy compound.

One curing accelerator may be used, or two or more thereof may be used in combination. The curing accelerator is preferably mixed in a proportion of about $1.0 \times 10^{-6}$ to $1.0 \times 10^{-2}$ parts by mass, more preferably about $5.0 \times 10^{-5}$ to $1.0 \times 10^{-3}$ parts by mass relative to 100 parts by mass of the modified polymer.

Specific examples of the pigment include, but are not limited to, inorganic pigments such as titanium dioxide, calcium carbonate, and carbon black; and organic pigments such as phthalocyanine pigment, quinacridone pigment, and azo pigment. The upper limit of the amount of the pigment added is commonly about 200 parts by mass relative to 100 parts by mass of the modified polymer.

Examples of the hydrophilizing agent used include methyl silicate, ethyl silicate, a fluoroalkyl silicate, and condensation products thereof. Examples of commercially available products thereof include ET40 and ET48 available from Colcoat Co., Ltd., MS56, MS56S, and MS57 available from Mitsubishi Chemical Corp., and GH700 and GH701 available from Daikin Industries, Ltd.

Examples of the matting agent include silica, silica alumina, alumina, talc, calcium carbonate, and titanium dioxide. The matting agent is preferably added in an amount of 1 to 100% by mass relative to the modified polymer. Examples of commercially available products thereof include Sylysia 350, Sylysia 436, Sylysia 446, Sylophobic 100, and Sylophobic 200 available from Fuji Silysia Chemical Ltd., and SYLOID ED2, SYLOID ED30, and SYLOID ED50 available from W.R. Grace.

Examples of the adhesion promoter include a variety of polyol additives such as polyester polyols, polycarbonate polyols, polyether polyols, and polybutadiene polyols and silane-coupling agents. The adhesion promoter is preferably added in an amount of 0.1 to 50% by mass relative to the modified polymer. Commercially available products thereof include Flexorez 148, Flexorez 188, and Flexorez A308 available from Kusumoto Chemicals, Ltd., ETERNACOLL UH-50 and ETERNACOLL UM-90 available from Ube Industries, Ltd., Adeka polyether P-400 and Adeka polyol BPX-21 available from ADEKA CORP., NISSO-PB GI-1000, GI-2000, and GI-3000 available from Nippon Soda Co., Ltd., PH-50 and PH-100 available from Ube Industries, Ltd., and Priplast-1838 and Priplast-3192 available from Croda Japan K.K.

The composition may be used as an interior coating material for a building material or interior material or an exterior coating material for a building material, automobile, aircraft, ship (e.g., deck, bottom), train, tank, and bridge, and may be directly applied to metal, concrete, and plastic or to a priming coat or priming/intermediate coat such as a wash primer, rust-preventive coating material, epoxy coating material, acrylic resin coating material, or polyester resin coating material. The composition may also be used as a sealing agent or a film-forming agent.

The composition or a film obtainable from the composition can be applied to a substrate formed from metal, concrete, plastic, stone, wood, or paper, or may be applied to a substrate with a primer layer or an intermediate layer in between. The primer may be a known primer, such as an epoxy primer or a zinc-rich primer. Examples of a coating material for forming the priming coat include an acrylic coating material, urethane coating material, polyester coating material, or epoxy coating material.

In addition to the above, the composition may also be used as a coating agent for back and front sheets of solar cells, or for golf balls, or as a coating film or coating agent having antifouling (e.g., coating film to which soil is less likely to stick outside or coating agent which enables easy wiping of soil), algae-proofing, or antibacterial activity.

The disclosure also provides a coating film containing the modified polymer. This feature allows the coating film to have excellent antifouling properties, as well as excellent properties such as weather resistance and adhesion to a substrate. The coating film is preferably a cured coating film.

The disclosure also provides a coating film obtainable by applying the composition. This feature allows the coating film to have excellent antifouling properties, as well as excellent properties such as weather resistance and adhesion to a substrate.

The coating film may be formed by applying the composition to a substrate, and optionally drying and curing the composition. The drying and curing is performed at 10° C. to 300° C., commonly 100° C. to 200° C., for 30 seconds to 3 days. The drying and curing may be followed by aging. The aging is commonly completed at 20° C. to 300° C. for one minute to three days.

In order to achieve good hiding performance, good weather resistance, good chemical resistance, and good moisture resistance, the coating film preferably has a thickness of 5 μm or more, more preferably 7 μm or more, still more preferably 10 μm or more. Too thick a film may fail to achieve a weight-reducing effect, and the upper limit thereof is preferably about 1000 μm, more preferably about 100 μm. The thickness is particularly preferably 10 to 40 μm.

Preferably, the coating film has a water contact angle of 95° or greater and a gloss retention of 80% or higher after 3000-hour QUVB testing. The water contact angle is more preferably 97° or greater, still more preferably 99° or greater.

The gloss retention after 3000-hour QUVB testing is preferably 85% or higher, more preferably 90% or higher. The coating film preferably has a water contact angle after 1000-hour QUVB testing of 80° or greater, more preferably 85° or greater, still more preferably 90° or greater.

The coating film also preferably has an oil contact angle of 10° or greater, more preferably 15° or greater, still more preferably 50° or greater.

The coating film also preferably has an oil contact angle after 1000-hour QUVB testing of 25° or greater, more preferably 30° or greater, still more preferably 40° or greater.

The coating film may be provided on a variety of substrates. A primer layer may be provided between the substrate and the coating film. Still, since the coating film has excellent adhesion, the substrate and the coating film can be directly bonded to each other with sufficient bond strength. A laminate including the coating film and the substrate is also a preferred aspect of the disclosure.

Examples of materials of the substrate include metal, ceramic, resin, and glass.

Examples of the metal include iron; stainless steel such as SUS304, SUS316L, and SUS403; aluminum; and plated steel sheets such as zinc-plated steel sheets and aluminum-plated steel sheets. Examples of the ceramic include pottery, porcelain, alumina material, zirconia material, and silicon oxide material. Examples of the resin include polyethylene terephthalate resin, polycarbonate resin, silicone resin, fluorosilicone resin, polyamide resin, polyamide-imide resin, polyimide resin, polyester resin, epoxy resin, polyphenylene sulfide resin, phenol resin, acrylic resin, and polyether sulfone resin.

The substrate used may be a water-impermeable sheet. The water-impermeable sheet is a layer to prevent permeation of moisture into the component, and any material substantially impermeable to water may be used. Examples of the water-impermeable sheet include copolymers such as polycarbonate resin, acrylic resin, methacrylic resin, ABS resin, polyolefin resins (e.g., polyethylene, polypropylene), polyvinyl halide resins (e.g., polyvinyl chloride, polyvinylidene chloride, polyvinyl fluoride, polyvinylidene fluoride), polyester resins (e.g., polyethylene terephthalate, polybutylene terephthalate), polyamide resins (e.g., nylon 6, nylon 66, metaxylene diamine-adipic acid copolymer (MXD nylon)), olefinic polymers having a substituent (e.g., polyvinyl acetate, polyvinyl alcohol), an ethylene-vinyl alcohol copolymer (EVA), and an ethylene-tetrafluoroethylene copolymer. Two or more of these materials may be used in combination.

Examples of materials of the substrate in the laminate include the aforementioned materials. Preferred among these is polyethylene terephthalate resin.

The laminate may be used for a building material, interior material, automobile, aircraft, ship (e.g., deck, bottom), train, tank, and bridge. The laminate of the disclosure has excellent weather resistance and excellent water- and oil-repellency, and is therefore significantly useful as a building material, for example. Also, the laminate of the disclosure has excellent weather resistance and excellent water- and oil-repellency, as well as excellent durability of the weather resistance and the water- and oil-repellency, and is therefore significantly useful for freeze prevention and frost prevention owing to the water repellency. For such use for freeze prevention and frost prevention, the laminate may be suitably used for antifouling of blades for wind power generation and of EPDM for railway vehicle couplers, antifouling and freeze prevention of road and bridge information boards, freeze prevention of power transmission lines, and frost delaying of heat exchangers of air conditioners, for example.

The laminate may also be suitably used as a back sheet of a solar cell module.

The disclosure provides a modified polymer (hereinafter, also referred to as a "first modified polymer of the disclosure") including:

(a) a main chain containing a fluorine-containing polymer; and
(b) a side chain represented by the following formula (b1') and/or a side chain represented by the following formula (b2'),
the formula (b1') being:

—CH$_2$—CR$^{b1}$(—X)—C(=O)—Y—Z—Rf    (b1')

wherein
X is a hydrogen atom, a methyl group, or a halogen atom;
Y is —O— or —NH—;
Z is a direct bond or a divalent organic group;
Rf is a C1-C20 fluoroalkyl group; and
R$^{b1}$ is a hydrogen atom or a monovalent organic group,
the formula (b2') being:

—CH$_2$—CR$^{b2}$(—R$^1$)—C(=O)—O—Si(—CH$_3$)$_2$—
[O—Si(—CH$_3$)$_2$]$_n$—O—Si(—CH$_3$)$_2$—R$^2$    (b2')

wherein
R$^1$ is a hydrogen atom or a methyl group;
R$^2$ is a hydrogen atom or a methyl group;
R$^{b2}$ is a hydrogen atom or a monovalent organic group; and
n is 3 to 200.

The disclosure also relates to a modified polymer (hereinafter, also referred to as a "second modified polymer of the disclosure") including:

a main chain containing (a) a fluorine-containing polymer; and
a side chain based on (b) a monomer represented by the following formula (b1) and/or a monomer represented by the following formula (b2),
the modified polymer being obtainable by reacting the fluorine-containing polymer and the monomer(s) in an organic solvent in the presence of a radical polymerization initiator,
the formula (b1) being:

CH$_2$=C(—X)—C(=O)—Y—Z—Rf    (b1)

wherein
X is a hydrogen atom, a methyl group, or a halogen atom;
Y is —O— or —NH—;
Z is a direct bond or a divalent organic group; and
Rf is a C1-C20 fluoroalkyl group,
the formula (b2) being:

CH$_2$=C(—R$^1$)—C(=O)—O—Si(—CH$_3$)$_2$—[O—Si(—CH$_3$)$_2$]$_n$—O—Si(—CH$_3$)$_2$—R$^2$    (b2)

wherein
R$^1$ is a hydrogen atom or a methyl group;
R$^2$ is a hydrogen atom or a methyl group; and
n is 3 to 200.

Hereinafter, unless otherwise mentioned, the simple term "modified polymer of the disclosure" means the concept that encompasses both the first modified polymer and the second modified polymer of the disclosure.

The fluorine-containing polymer preferably contains a unit represented by —CHR—, wherein R is a hydrogen atom or a monovalent organic group.

The fluorine-containing polymer preferably contains a polymerized unit based on tetrafluoroethylene or chlorotrifluoroethylene.

The disclosure also provides a composition containing the modified polymer.

The composition of the disclosure preferably further contains a solvent.

The composition of the disclosure preferably further contains a curing agent.

The composition of the disclosure is preferably a coating material.

The composition of the disclosure is preferably a composition for freeze prevention and/or frost prevention.

The disclosure also provides a coating film obtainable by applying the composition.

The coating film of the disclosure preferably has a water contact angle of 95° or greater and a gloss retention of 80% or higher after 3000-hour QUVB testing.

The coating film of the disclosure preferably has a water contact angle of 80° or greater after 1000-hour QUVB testing and an oil contact angle of 25° or greater after 1000-hour QUVB testing.

The disclosure also provides a laminate including a substrate and the coating film.

EXAMPLES

The disclosure is described hereinbelow with reference to examples. Still, the disclosure is not limited to these examples.

The parameters in the examples were measured by the following methods.

Amounts of Monomer Units Constituting Polymer

The amounts (mol %) of the respective monomer units were calculated by the fluorine content (% by mass) determined by elemental analysis and the composition analysis by $^1$HNMR spectrometry.

Hydroxyl Value

The hydroxyl value was calculated from the amount of a hydroxy group-containing monomer actually fed for the polymerization and the solid content thereof.

Reference Synthesis Example 1
(Fluorine-Containing Polymer 1)

A 6000-ml stainless steel autoclave was charged with 2891 g of butyl acetate, 638.0 g of vinyl neononanoate, and 156.7 g of 4-hydroxybutyl vinyl ether (HBVE), followed by an operation of vacuum nitrogen purging. Next, 481.7 g of tetrafluoroethylene (TFE) was fed thereinto, and 12.5 g of a peroxide polymerization initiator was then fed to initiate polymerization. Simultaneously, a mixture of 639.0 g of vinyl neononanoate and 156.7 g of HBVE was continuously fed for 1.5 hours. At the same temperature, the reaction was allowed to proceed for three hours from the feeding of the initiator, and 12.5 g of the peroxide polymerization initiator was then additionally fed. At the same temperature, the reaction was allowed to proceed for another four hours. When the internal pressure of the reactor was reduced from 1.4 MPaG (14.5 kgf/cm$^2$G) to 0.2 MPaG (2.1 kgf/cm$^2$G), the reaction was stopped. Thereby, a solution containing a polymer was obtained.

The resulting polymer had a hydroxyl value of 63 mgKOH/g.

Reference Synthesis Example 2
(Fluorine-Containing Polymer 2)

A 6000-ml stainless steel autoclave was charged with 2500 g of butyl acetate, 584 g of vinyl neononanoate, and 527 g of 4-hydroxybutyl vinyl ether (HBVE), followed by an operation of vacuum nitrogen purging. Next, 658 g of tetrafluoroethylene (TFE) was fed thereinto, and 30 g of a peroxide polymerization initiator was then fed to initiate polymerization. When the internal pressure of the reactor was reduced from 1.0 MPaG to 0.4 MPaG, the reaction was stopped. Thereby, a solution containing a polymer was obtained. The resulting polymer had a hydroxyl value of 130 mgKOH/g.

Reference Synthesis Example 3
(Fluorine-Containing Polymer 3)

A 6000-ml stainless steel autoclave was purged with nitrogen, and then charged with 2000 g of butyl acetate, 196.0 g of vinyl acetate, 55.2 g of 4-hydroxybutyl vinyl ether (HBVE), and 5.6 g of undecylenic acid. Next, 400 g of chlorotrifluoroethylene was fed thereinto, and 9.6 g of a peroxide polymerization initiator was then fed to initiate reaction. After six hours from the start of polymerization, the vessel was returned to normal temperature and normal pressure, so that the polymerization was stopped. Thereby, a solution containing a polymer was obtained. The resulting polymer had a hydroxyl value of 50 mgKOH/g and an acid value of 3.2 mgKOH/g.

Reference Synthesis Example 4 (Homopolymer of F Monomer 1)

A 1-L reaction container was charged with butyl acetate (90 g). The system was heated up to 90° C. and stirred for 30 minutes. Thereto was added dropwise a solution mixture of a F monomer 1 (6.5 g), a chain transfer agent (0.0975 g), an initiator (0.0845 g), and butyl acetate (15 g) over one hour. The system was then stirred at 90° C. for two hours. Thereby, a polymer solution of Reference Synthesis Example 4 was synthesized.

The F monomer 1 is a compound represented by $CH_2=CHCOOCH_2CH_2C_6F_{13}$.

Reference Synthesis Example 5 (Homopolymer of Si Monomer 1)

A 1-L reaction container was charged with butyl acetate (90 g). The system was heated up to 90° C. and stirred for 30 minutes. Thereto was added dropwise a solution mixture of a Si monomer 1 (3.9 g), a chain transfer agent (0.0429 g), an initiator (0.0507 g), and butyl acetate (15 g) over one hour. The system was then stirred at 90° C. for two hours. Thereby, a polymer solution of Reference Synthesis Example 5 was synthesized.

The Si monomer 1 is a compound represented by the following formula:

[Chem. 21]

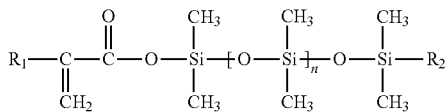

wherein $R^1$ is a hydrogen atom; $R^2$ is $CH_3$; and an average value of n is 60.

Reference Synthesis Example 6 (Ac—F Polymer)

A 1-L reaction container was charged with butyl acetate (90 g). The system was heated up to 90° C. and stirred for 30 minutes. Thereto was added dropwise a solution mixture of a F monomer 1 (6.5 g), 4-hydroxybutyl acrylate (HBA) (1.3 g) serving as a hydroxy group-containing monomer, glycidyl methacrylate (GMA) (1.3 g) serving as an epoxy group-containing monomer, a chain transfer agent (0.1365 g), an initiator (0.1183 g), and butyl acetate (15 g) over one hour. The system was then stirred at 90° C. for two hours. Thereby, a polymer solution of Reference Synthesis Example 6 was synthesized.

Reference Synthesis Example 7 (Ac—Si Polymer)

A 1-L reaction container was charged with butyl acetate (90 g). The system was heated up to 90° C. and stirred for 30 minutes. Thereto was added dropwise a solution mixture of a Si monomer 1 (3.9 g), a hydroxy group-containing monomer HBA (0.78 g), a chain transfer agent (0.05148 g), an initiator (0.06048 g), and butyl acetate (15 g) over one hour. The system was then stirred at 90° C. for two hours. Thereby, a polymer solution of Reference Synthesis Example 7 was synthesized.

Example 1

A 1-L reaction container was charged with a fluorine-containing polymer 1 (200 g) serving as a main chain reactant solution and butyl acetate (20 g). The system was heated up to 90° C. and stirred for 30 minutes. Thereto was added dropwise a solution mixture of a side chain reactant F monomer 1 (6.5 g), a chain transfer agent (0.0975 g), an initiator (0.0845 g), and butyl acetate (15 g) over one hour. The system was then stirred at 90° C. for two hours. Thereby, a polymer solution of Example 1 was synthesized.

According to the conditions shown in Table 2, the synthesized polymer solution (100 g) was combined with a curing agent Desmodur N3390 available from Sumika Bayer Urethane Co., Ltd. (25.8 g) and butyl acetate (40 g) and the contents were stirred at room temperature for 30 minutes. The mixture was applied to a tinplate and dried at 80° C. for three hours. Thereby, a coated plate to be evaluated having a dry thickness of 25 μm was formed and subjected to the evaluations shown separately (Tables 1 to 3)

Example 2

A polymer solution was synthesized, a coated plate was formed, and the evaluations were performed in the same manner as in Example 1 except that the synthesis of polymer solution was performed such that, in addition to the side chain reactant F monomer 1 (6.5 g), the chain transfer agent (0.1365 g), the initiator (0.1183 g), and butyl acetate (15 g), the solution mixture to be added dropwise contained HBA (1.3 g) serving as a hydroxy group-containing monomer and GMA (1.3 g) serving as an epoxy group-containing monomer.

Examples 3 to 17

A polymer solution was synthesized, a coated plate was formed, and the evaluations were performed in the same manner as in Example 1 or 2 except that the types and amounts of the materials were changed as shown in Tables 1 to 3.

The F monomer 2 is a compound represented by $CH_2=C(CH_3)COOCH_2CH_2C_6F_{13}$.

The Si monomer 2 is a compound represented by the following formula:

[Chem. 22]

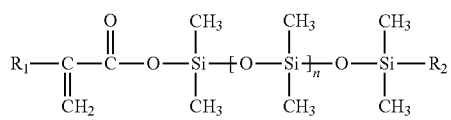

wherein $R_1$ is a hydrogen atom; $R_2$ is $CH_3$; and an average value of n is 160.

Comparative Examples 1 to 5

A coating material was obtained such that a curing agent and a diluting agent were in proportions shown in Tables 1 to 3 relative to 100 parts by mass of the solid content of the fluorine-containing polymer 1, the fluorine-containing polymer 2, the fluorine-containing polymer 3, the Ac—F polymer, or the Ac—Si polymer. Then, a coated plate was formed and the evaluations were performed.

Comparative Example 6

According to the conditions shown in Tables 1 to 3, the materials and the fluorine-containing polymer 1 (200 g) were fed into a 1-L reaction container. The contents were heated up to 90° C. and then stirred for 30 minutes. A homopolymer of the F monomer 1 (10 g) was dropwise added over one hour. The system was stirred at 90° C. for two hours. Thereby, a polymer solution of Comparative Example 6 was formed.

According to the conditions shown in Tables 1 to 3, the resulting polymer solution (100 g) was combined with a curing agent N3390 (12 g) and butyl acetate (40 g), and the contents were stirred at room temperature for 30 minutes. The mixture was applied to a tinplate and dried at 80° C. for three hours. Thereby, a coated plate to be evaluated having a dry thickness of 25 μm was formed and subjected to the evaluations shown separately (Tables 1 to 3).

Comparative Examples 7 to 11

A polymer solution was formed, a coated plate was formed, and the evaluations were performed in the same manner as in Comparative Example 6 except that the amounts of the materials were changed as shown in Tables 1 to 3.

Items to be Evaluated

Water and oil contact angles: The contact angles were measured using a G-1 contact angle meter available from Kyowa Interface Science Co., Ltd.

Wiping of permanent ink: Ink staining of black permanent marker available from ZEBRA Co., Ltd. was wiped off with a dry cloth and the ink residue was visually evaluated.

QUVB: Using an accelerated aging tester available from QLAB Corp., accelerated weather resistance testing was performed at an irradiation intensity of 0.63 W/cm² with an operating cycle of 4-hour irradiation (60° C.) and 4-hour no-irradiation.

Gloss retention: The gloss at 60° was measured using AG-4442 available from BYK.

Color difference: The color difference was measured using DP-400 and CR-400 chroma meters available from Konica Minolta, Inc.

TABLE 1

| | | Active ingredient | Example 1 | Example 2 | Example 3 | Example 4 | Example 5 |
|---|---|---|---|---|---|---|---|
| Main-chain resin | Fluorine-containing polymer 1 | 65% | 200 | 200 | 200 | 200 | 200 |
| | Fluorine-containing polymer 2 | 65% | | | | | |
| | Fluorine-containing polymer 3 | 50% | | | | | |
| Diluting agent | Butyl acetate | 100% | 20 | 20 | 20 | 20 | 20 |
| Side-chain reactant | F monomer 1 | 100% | 6.5 | 6.5 | | | |
| | F monomer 2 | 100% | | | 6.5 | | |
| | Si monomer 1 | 100% | | | | 3.9 | 3.9 |
| | Si monomer 2 | 100% | | | | | |
| | HBA | 100% | | 1.3 | 1.3 | | 0.78 |
| | GMA | 100% | | 1.3 | 1.3 | | |
| Chain transfer agent | | 100% | 0.0975 | 0.1365 | 0.1365 | 0.0429 | 0.05148 |
| Initiator | | 100% | 0.0845 | 0.1183 | 0.1183 | 0.0507 | 0.06084 |
| Diluting agent | Butyl acetate | 100% | 15 | 15 | 15 | 15 | 15 |
| Resin for comparative mixing | Homopolymer of F monomer 1 | 65% | | | | | |
| | Homopolymer of Si monomer 1 | 65% | | | | | |
| Resin for comparison | Ac—F polymer | 55% | | | | | |
| | Ac—Si polymer | 55% | | | | | |
| Preparation of coating material | | | | | | | |
| Synthesized polymer | | — | 100 | 100 | 100 | 100 | 100 |
| Curing agent | N3390 | 90% | 12 | 12 | 12 | 12.2 | 12.2 |
| Diluting agent | Butyl acetate | 100% | 40 | 40 | 40 | 40 | 40 |
| Evaluation | | | | | | | |
| Initial water contact angle (°) | | — | 102.1 | 106.2 | 107.9 | 99.8 | 101.9 |
| Initial oil contact angle (°) | | — | 56.2 | 65.3 | 68.6 | 15.5 | 16.3 |
| Wiping of permanent ink (with dry cloth) | | — | Good | Good | Good | Good | Good |
| QUVB1000h | Water contact angle (°) | — | 95.6 | 96.4 | 96.4 | 88.3 | 94.6 |
| | Oil contact angle (°) | — | 45.2 | 46.8 | 46.4 | 26.4 | 29.8 |
| QUVB3000h | Gloss retention | — | 93.4% | 94.5% | 93.2% | 80.8% | 76.1% |
| | Color difference | — | 0.68 | 0.66 | 0.65 | 1.03 | 0.8 |

TABLE 1-continued

|  |  | Example 6 | Example 7 | Example 8 | Example 9 | Example 10 |
|---|---|---|---|---|---|---|
| Main-chain resin | Fluorine-containing polymer 1 | 200 | 200 |  |  |  |
|  | Fluorine-containing polymer 2 |  |  | 200 | 200 | 200 |
|  | Fluorine-containing polymer 3 |  |  |  |  |  |
| Diluting agent | Butyl acetate | 20 | 20 | 20 | 20 | 20 |
| Side-chain reactant | F monomer 1 |  | 1.95 | 6.5 | 6.5 |  |
|  | F monomer 2 |  |  |  |  | 6.5 |
|  | Si monomer 1 |  | 1.95 |  |  |  |
|  | Si monomer 2 | 3.9 |  |  |  |  |
|  | HBA | 0.78 | 0.78 |  | 1.3 | 1.3 |
|  | GMA |  |  |  | 1.3 | 1.3 |
| Chain transfer agent |  | 0.05148 | 0.05148 | 0.0975 | 0.1365 | 0.1365 |
| Initiator |  | 0.06084 | 0.06084 | 0.0845 | 0.1183 | 0.1183 |
| Diluting agent | Butyl acetate | 15 | 15 | 15 | 15 | 15 |
| Resin for comparative mixing | Homopolymer of F monomer 1 |  |  |  |  |  |
|  | Homopolymer of Si monomer 1 |  |  |  |  |  |
| Resin for comparison | Ac—F polymer |  |  |  |  |  |
|  | Ac—Si polymer |  |  |  |  |  |
| Preparation of coating material |  |  |  |  |  |  |
| Synthesized polymer |  | 100 | 100 | 100 | 100 | 100 |
| Curing agent | N3390 | 12.2 | 12.2 | 25.8 | 25.8 | 25.8 |
| Diluting agent | Butyl acetate | 40 | 40 | 40 | 40 | 40 |
| Evaluation |  |  |  |  |  |  |
| Initial water contact angle (°) |  | 102.2 | 102.5 | 98.4 | 106.8 | 95.6 |
| Initial oil contact angle (°) |  | 12.5 | 50 | 57.4 | 66.7 | 15.5 |
| Wiping of permanent ink (with dry cloth) |  | Good | Good | Good | Good | Good |
| QUVB1000h | Water contact angle (°) | 95.2 | 96.1 | 91.2 | 97.1 | 88.9 |
|  | Oil contact angle (°) | 28.5 | 41.8 | 30.4 | 48.1 | 27.4 |
| QUVB3000h | Gloss retention | 81.2% | 90.2% | 87.4% | 95.4% | 82.1% |
|  | Color difference | 1.14 | 0.66 | 1.29 | 0.61 | 1.12 |

TABLE 2

|  |  | Active ingredient | Example 11 | Example 12 | Example 13 |
|---|---|---|---|---|---|
| Main-chain resin | Fluorine-containing polymer 1 | 65% |  |  |  |
|  | Fluorine-containing polymer 2 | 65% | 200 | 200 | 200 |
|  | Fluorine-containing polymer 3 | 50% |  |  |  |
| Diluting agent | Butyl acetate | 100% | 20 | 20 | 20 |
| Side-chain reactant | F monomer 1 | 100% |  |  |  |
|  | F monomer 2 | 100% |  |  |  |
|  | Si monomer 1 | 100% | 3.9 | 3.9 |  |
|  | Si monomer 2 | 100% |  |  | 3.9 |
|  | HBA | 100% |  | 0.78 | 0.78 |
|  | GMA | 100% |  |  |  |
| Chain transfer agent |  | 100% | 0.0429 | 0.05148 | 0.05148 |
| Initiator |  | 100% | 0.0507 | 0.06084 | 0.06084 |
| Diluting agent | Butyl acetate | 100% | 15 | 15 | 15 |
| Resin for comparative mixing | Homopolymer of F monomer 1 | 65% |  |  |  |
|  | Homopolymer of Si monomer 1 | 65% |  |  |  |
| Resin for comparison | Ac—F polymer | 55% |  |  |  |
|  | Ac—Si polymer | 55% |  |  |  |
| Preparation of coating material |  |  |  |  |  |
| Synthesized polymer |  | — | 100 | 100 | 100 |
| Curing agent | N3390 | 90% | 26.5 | 26.5 | 26.5 |
| Diluting agent | Butyl acetate | 100% | 40 | 40 | 40 |
| Evaluation |  |  |  |  |  |
| Initial water contact angle (°) |  | — | 102.3 | 103.5 | 108.4 |
| Initial oil contact angle (°) |  | — | 16.9 | 50.2 | 69.6 |
| Wiping of permanent ink (with dry cloth) |  | — | Good | Good | Good |
| QUVB1000h | Water contact angle (°) | — | 95.3 | 96.4 | 97.5 |
|  | Oil contact angle (°) | — | 31.8 | 42.3 | 47.6 |

TABLE 2-continued

|  |  |  | | | |
|---|---|---|---|---|---|
| QUVB3000h | Gloss retention | — | 88.4% | 90.5% | 94.7% |
|  | Color difference | — | 0.78 | 0.65 | 0.59 |

|  |  | Example 14 | Example 15 | Example 16 | Example 17 |
|---|---|---|---|---|---|
| Main-chain resin | Fluorine-containing polymer 1 |  |  |  |  |
|  | Fluorine-containing polymer 2 | 200 |  |  |  |
|  | Fluorine-containing polymer 3 |  | 200 | 200 | 200 |
| Diluting agent | Butyl acetate | 20 | 20 | 20 | 20 |
| Side-chain reactant | F monomer 1 | 1.95 | 5 |  | 1.5 |
|  | F monomer 2 |  |  |  |  |
|  | Si monomer 1 | 1.95 |  | 3 | 1.5 |
|  | Si monomer 2 |  |  |  |  |
|  | HBA | 0.78 | 1 | 0.6 | 0.6 |
|  | GMA |  | 1 |  |  |
| Chain transfer agent |  | 0.05148 | 0.105 | 0.0396 | 0.0396 |
| Initiator |  | 0.06084 | 0.091 | 0.0468 | 0.0468 |
| Diluting agent | Butyl acetate | 15 | 15 | 15 | 15 |
| Resin for comparative mixing | Homopolymer of F monomer 1 |  |  |  |  |
|  | Homopolymer of Si monomer 1 |  |  |  |  |
| Resin for comparison | Ac—F polymer |  |  |  |  |
|  | Ac—Si polymer |  |  |  |  |
| Preparation of coating material |  |  |  |  |  |
| Synthesized polymer |  | 100 | 100 | 100 | 100 |
| Curing agent | N3390 | 26.5 | 9.1 | 9.1 | 9.1 |
| Diluting agent | Butyl acetate | 40 | 40 | 40 | 40 |
| Evaluation |  |  |  |  |  |
| Initial water contact angle (°) |  | 103 | 105.2 | 101.4 | 101.6 |
| Initial oil contact angle (°) |  | 12.4 | 64.7 | 17.2 | 50.4 |
| Wiping of permanent ink (with dry cloth) |  | Good | Good | Good | Good |
| QUVB1000h | Water contact angle (°) | 96.1 | 95.8 | 93.2 | 95.8 |
|  | Oil contact angle (°) | 29.4 | 43.4 | 25.5 | 44.2 |
| QUVB3000h | Gloss retention | 83.8% | 91.0% | 83.6% | 89.5% |
|  | Color difference | 1.04 | 0.72 | 0.81 | 0.71 |

TABLE 3

|  |  | Active ingredient | Comparative Example 1 | Comparative Example 2 | Comparative Example 3 | Comparative Example 4 | Comparative Example 5 |
|---|---|---|---|---|---|---|---|
| Main-chain resin | Fluorine-containing polymer 1 | 65% | 200 |  |  |  |  |
|  | Fluorine-containing polymer 2 | 65% |  | 200 |  |  |  |
|  | Fluorine-containing polymer 3 | 50% |  |  | 200 |  |  |
| Diluting agent | Butyl acetate | 100% |  |  |  |  |  |
| Side-chain reactant | F monomer 1 | 100% |  |  |  |  |  |
|  | F monomer 2 | 100% |  |  |  |  |  |
|  | Si monomer 1 | 100% |  |  |  |  |  |
|  | Si monomer 2 | 100% |  |  |  |  |  |
|  | HBA | 100% |  |  |  |  |  |
|  | GMA | 100% |  |  |  |  |  |
| Chain transfer agent |  | 100% |  |  |  |  |  |
| Initiator |  | 100% |  |  |  |  |  |
| Diluting agent | Butyl acetate | 100% |  |  |  |  |  |
| Resin for comparative mixing | Homopolymer of F monomer 1 | 65% |  |  |  |  |  |
|  | Homopolymer of Si monomer 1 | 65% |  |  |  |  |  |
| Resin for comparison | Ac—F polymer | 55% |  |  |  | 200 |  |
|  | Ac—Si polymer | 55% |  |  |  |  | 200 |

TABLE 3-continued

| Preparation of coating material | | | | | | | |
|---|---|---|---|---|---|---|---|
| Synthesized polymer | | — | 100 | 100 | 100 | 100 | 100 |
| Curing agent | N3390 | 90% | 14.9 | 32.3 | 9.5 | 21 | 21 |
| Diluting agent | Butyl acetate | 100% | 40 | 40 | 40 | 40 | 40 |
| Evaluation | | | | | | | |
| Initial water contact angle (°) | | — | 83.8 | 84.6 | 81.5 | 105.4 | 96.1 |
| Initial oil contact angle (°) | | — | 5 | 5 | 5 | 41.8 | 22.4 |
| Wiping of permanent ink (with dry cloth) | | — | Poor | Poor | Poor | Good | Good |
| QUVB1000h | Water contact angle (°) | — | 74.6 | 77.2 | 72.4 | 72.4 | 73.8 |
| | Oil contact angle (°) | — | 5 | 5 | 5 | 24.2 | 14.7 |
| QUVB3000h | Gloss retention | — | 85.8% | 86.5% | 81.7% | 75.3% | 62.1% |
| | Color difference | — | 1.58 | 1.53 | 1.82 | 1.24 | 1.54 |

| | | Comparative Example 6 | Comparative Example 7 | Comparative Example 8 | Comparative Example 9 | Comparative Example 10 | Comparative Example 11 |
|---|---|---|---|---|---|---|---|
| Main-chain resin | Fluorine-containing polymer 1 | 200 | 200 | | | | |
| | Fluorine-containing polymer 2 | | | 200 | 200 | | |
| | Fluorine-containing polymer 3 | | | | | 200 | 200 |
| Diluting agent | Butyl acetate | | | | | | |
| Side-chain reactant | F monomer 1 | | | | | | |
| | F monomer 2 | | | | | | |
| | Si monomer 1 | | | | | | |
| | Si monomer 2 | | | | | | |
| | HBA | | | | | | |
| | GMA | | | | | | |
| Chain transfer agent | | | | | | | |
| Initiator | | | | | | | |
| Diluting agent | Butyl acetate | | | | | | |
| Resin for comparative mixing | Homopolymer of F monomer 1 | 10 | | 10 | | 7.7 | |
| | Homopolymer of Si monomer 1 | | 6 | | 6 | | 4.6 |
| Resin for comparison | Ac—F polymer | | | | | | |
| | Ac—Si polymer | | | | | | |
| Preparation of coating material | | | | | | | |
| Synthesized polymer | | 100 | 100 | 100 | 100 | 100 | 100 |
| Curing agent | N3390 | 12 | 12 | 25.8 | 25.8 | 9.1 | 9.1 |
| Diluting agent | Butyl acetate | 40 | 40 | 40 | 40 | 40 | 40 |
| Evaluation | | | | | | | |
| Initial water contact angle (°) | | 98.4 | 94.2 | 99.2 | 95.5 | 96.8 | 93.5 |
| Initial oil contact angle (°) | | 35.4 | 26.8 | 38.2 | 21.7 | 31.6 | 24.2 |
| Wiping of permanent ink (with dry cloth) | | Good | Good | Good | Good | Good | Good |
| QUVB1000h | Water contact angle (°) | 75.2 | 74.7 | 76.8 | 75.2 | 72.4 | 72 |
| | Oil contact angle (°) | 16.2 | 15.1 | 17.3 | 16.5 | 14.8 | 13.2 |
| QUVB3000h | Gloss retention | 83.4% | 83.1% | 84.2% | 83.6% | 81.8% | 81.0% |
| | Color difference | 1.42 | 1.59 | 1.36 | 1.85 | 1.67 | 1.92 |

What is claimed is:

1. A modified polymer comprising:
   (a) a main chain containing a fluorine-containing polymer, containing a unit represented by —CHR—, wherein R is a hydrogen atom or a monovalent organic group, and containing a polymerized unit based on tetrafluoroethylene or chlorotrifluoroethylene; and
   (b) a side chain represented by the following formula (b2'), or a side chain represented by the following formula (b1') and a side chain represented by the following formula (b2'),
   the formula (b1') being:

—CH$_2$—CR$^{b1}$(—X)—C(=O)—Y—Z—Rf    (b1')

wherein
   X is a hydrogen atom, a methyl group, or a halogen atom;
   Y is —O— or —NH—;
   Z is a direct bond or a divalent organic group;
   Rf is a C1-C20 fluoroalkyl group; and
   R$^{b1}$ is a hydrogen atom or a monovalent organic group, the formula (b2') being:

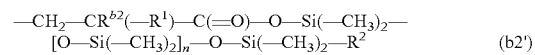
   (b2')

wherein
   R$^1$ is a hydrogen atom or a methyl group;
   R$^2$ is a hydrogen atom or a methyl group;
   R$^{b2}$ is a hydrogen atom or a monovalent organic group; and
   n is 3 to 200.

2. A composition comprising the modified polymer according to claim 1.

3. The composition according to claim 2, further comprising a solvent.

4. The composition according to claim 2, further comprising a curing agent.

5. The composition according to claim 2,
   wherein the composition is a coating material.

6. The composition according to claim 2,
wherein the composition is a composition for freeze prevention and/or frost prevention.

7. A coating film obtained by applying the composition according to claim 2.

8. The coating film according to claim 7,
wherein the coating film has a water contact angle of 95° or greater and a gloss retention of 80% or higher after 3000-hour QUVB testing.

9. The coating film according to claim 7,
wherein the coating film has a water contact angle of 80° or greater after 1000-hour QUVB testing and an oil contact angle of 25° or greater after 1000-hour QUVB testing.

10. A laminate comprising a substrate and the coating film according to claim 7.

11. A coating material, comprising:
the modified polymer according to claim 1; and
a solvent.

12. The coating material according claim 11, wherein the solvent is at least one selected from the group consisting of esters, aliphatic hydrocarbons, alcohols, and cyclic ethers.

13. The coating material according claim 11, wherein the fluorine-containing polymer in the main chain further comprises a unit, a vinyl ester unit containing neither a hydroxy group nor an aromatic ring, and/or a hydroxy group-containing monomer unit.

14. The coating material according claim 11, wherein the solvent is at least one selected from the group consisting of esters, aliphatic hydrocarbons, alcohols, and cyclic ethers, and
wherein the fluorine-containing polymer in the main chain further comprises a vinyl ester unit containing neither a hydroxy group nor an aromatic ring, and/or a hydroxy group-containing monomer unit.

15. A modified polymer according to claim 1, comprising: (b) a side chain represented by the formula (b1') and a side chain represented by the formula (b2').

* * * * *